(12) United States Patent
Chen et al.

(10) Patent No.: US 11,514,062 B2
(45) Date of Patent: Nov. 29, 2022

(54) FEATURE VALUE GENERATION DEVICE, FEATURE VALUE GENERATION METHOD, AND FEATURE VALUE GENERATION PROGRAM

(71) Applicant: dotData, Inc., San Mateo, CA (US)

(72) Inventors: Ting Chen, Tokyo (JP); Yukitaka Kusumura, Tokyo (JP); Ryohei Fujimaki, San Mateo, CA (US); Kazuyo Narita, Tokyo (JP); Masato Asahara, Tokyo (JP); Yusuke Muraoka, Tokyo (JP)

(73) Assignee: DOTDATA, INC., San Mateo, CA (US)

( * ) Notice: Subject to any disclaimer, the term of this patent is extended or adjusted under 35 U.S.C. 154(b) by 168 days.

(21) Appl. No.: 16/753,757

(22) PCT Filed: Jun. 12, 2018

(86) PCT No.: PCT/JP2018/022429
§ 371 (c)(1),
(2) Date: Jun. 1, 2020

(87) PCT Pub. No.: WO2019/069507
PCT Pub. Date: Apr. 11, 2019

(65) Prior Publication Data
US 2020/0301921 A1    Sep. 24, 2020

Related U.S. Application Data

(60) Provisional application No. 62/568,397, filed on Oct. 5, 2017.

(51) Int. Cl.
*G06F 16/2458* (2019.01)
*G06F 16/28* (2019.01)
(Continued)

(52) U.S. Cl.
CPC ...... *G06F 16/2465* (2019.01); *G06F 16/2456* (2019.01); *G06F 16/285* (2019.01);
(Continued)

(58) Field of Classification Search
None
See application file for complete search history.

(56) References Cited

U.S. PATENT DOCUMENTS 5,873,088 A   2/1999  Hayashi et al.
6,636,860 B2  10/2003 Vishnubhotla
(Continued)

FOREIGN PATENT DOCUMENTS

CN   102714767 A   10/2012
CN   104408149 A    3/2015
(Continued)

OTHER PUBLICATIONS

Samorani et al., "A Randonmized Exhaustive Propositionalization Approach For Molecule Classification", Leeds School of Business, University of Colorado at Boulder, UCB 419, Boulder, Colorado 80309-0419, 27 pages.
(Continued)

*Primary Examiner* — Robert W Beausoliel, Jr.
*Assistant Examiner* — Cheryl M Shechtman
(74) *Attorney, Agent, or Firm* — DLA Piper LLP US

(57) ABSTRACT

A table acquiring means 381 acquires a first table including prediction objects and first attributes, and a second table including second attributes. A receiving means 382 receives a similarity function and condition for similarity used to calculate the similarity between the first attribute and the second attribute. A feature generating means 383 generates feature candidates able to affect a prediction object using a combination condition for combining a record in the first table including the value of a first attribute satisfying the
(Continued)

condition with a record in the second table including the value of a second attribute satisfying the similarity calculated with the value of the first attribute and the value of the second attribute using the similarity function, and using a reduction method for a plurality of records in the second table and a reduction condition represented by the column to be aggregated. A feature selecting means 384 selects an optimum feature for the prediction from the feature candidates.

20 Claims, 20 Drawing Sheets

(51) Int. Cl.
    *G06N 20/00*         (2019.01)
    *G06F 16/2455*    (2019.01)
    *G06N 5/04*          (2006.01)
    *G06F 40/30*        (2020.01)

(52) U.S. Cl.
    CPC .............. *G06F 40/30* (2020.01); *G06N 5/04* (2013.01); *G06N 20/00* (2019.01)

(56) References Cited

U.S. PATENT DOCUMENTS

| | | | |
|---|---|---|---|
| 6,718,346 | B1 | 4/2004 | Brown et al. |
| 6,973,459 | B1 | 12/2005 | Yarmus |
| 7,225,200 | B2 | 5/2007 | Chickering et al. |
| 7,546,312 | B1 | 6/2009 | Xu et al. |
| 7,991,583 | B2 | 8/2011 | Balzer et al. |
| 8,620,934 | B2 | 12/2013 | Fong et al. |
| 8,731,881 | B2 | 5/2014 | Fujimaki et al. |
| 9,130,832 | B1 | 9/2015 | Boe et al. |
| 9,146,984 | B1 | 9/2015 | Bozkaya et al. |
| 9,934,266 | B2 | 4/2018 | Wright et al. |
| 10,452,632 | B1 | 10/2019 | Simmen et al. |
| 10,713,589 | B1 | 7/2020 | Zarandioon |
| 11,182,691 | B1 | 11/2021 | Zhang |
| 2002/0147599 | A1 | 10/2002 | Vishnubhotla |
| 2002/0198889 | A1 | 12/2002 | Vishnubhotla |
| 2004/0010505 | A1 | 1/2004 | Vishnubhotla |
| 2004/0153250 | A1 | 8/2004 | Hurst et al. |
| 2005/0102303 | A1 | 5/2005 | Russell et al. |
| 2006/0173873 | A1 | 8/2006 | Prompt et al. |
| 2006/0218132 | A1 | 9/2006 | Mukhin et al. |
| 2007/0011134 | A1 | 1/2007 | Langseth et al. |
| 2007/0136346 | A1 | 6/2007 | Morris et al. |
| 2007/0185868 | A1 | 8/2007 | Roth et al. |
| 2007/0203893 | A1 | 8/2007 | Krinsky et al. |
| 2008/0263093 | A1 | 10/2008 | Alcorn et al. |
| 2009/0162824 | A1 | 6/2009 | Heck |
| 2009/0164943 | A1 | 6/2009 | Ryan et al. |
| 2010/0082601 | A1 | 4/2010 | Ramesh et al. |
| 2010/0106747 | A1 | 4/2010 | Honzal et al. |
| 2011/0302187 | A1 | 12/2011 | Otsuka et al. |
| 2012/0054174 | A1 | 3/2012 | Gagnier et al. |
| 2012/0173226 | A1 | 7/2012 | McEvoy et al. |
| 2012/0290981 | A1 | 11/2012 | Uchida |
| 2012/0330931 | A1 | 12/2012 | Nakano et al. |
| 2013/0246996 | A1 | 9/2013 | Duggal et al. |
| 2014/0136471 | A1 | 5/2014 | Kumar |
| 2014/0188918 | A1 | 7/2014 | Shamlin et al. |
| 2014/0201194 | A1 | 7/2014 | Reddy et al. |
| 2014/0223284 | A1 | 8/2014 | Rankin, Jr. et al. |
| 2014/0279074 | A1 | 9/2014 | Chen et al. |
| 2015/0309990 | A1 | 10/2015 | Allen et al. |
| 2015/0310082 | A1 | 10/2015 | Han et al. |
| 2015/0356123 | A1 | 12/2015 | Gorelik |
| 2015/0379428 | A1 | 12/2015 | Dirac et al. |
| 2015/0379430 | A1 | 12/2015 | Dirac et al. |
| 2016/0042039 | A1 | 2/2016 | Kaufmann et al. |
| 2016/0103897 | A1 | 4/2016 | Nysewander et al. |
| 2016/0173122 | A1 | 6/2016 | Akitomi et al. |
| 2016/0232213 | A1 | 8/2016 | Morinaga et al. |
| 2016/0342606 | A1 | 11/2016 | Le Mouel et al. |
| 2017/0109629 | A1 | 4/2017 | Kusumura et al. |
| 2017/0213158 | A1 | 7/2017 | Muraoka et al. |
| 2018/0095952 | A1 | 4/2018 | Rehal |
| 2018/0121442 | A1 | 5/2018 | Asadi et al. |
| 2018/0373764 | A1 | 12/2018 | Kusumura et al. |
| 2019/0043127 | A1* | 2/2019 | Mahapatra ........... G06N 3/0445 |
| 2020/0057948 | A1 | 2/2020 | Fujimaki et al. |
| 2020/0334246 | A1* | 10/2020 | Chen ...................... G06F 16/29 |
| 2020/0387505 | A1 | 12/2020 | Kusumura et al. |
| 2020/0387664 | A1* | 12/2020 | Kusumura ............ G06F 16/243 |
| 2021/0342341 | A1 | 11/2021 | Fujimaki et al. |
| 2021/0357372 | A1 | 11/2021 | Fujimaki et al. |

FOREIGN PATENT DOCUMENTS

| | | |
|---|---|---|
| CN | 104881424 A | 9/2015 |
| JP | H11219367 A | 8/1999 |
| JP | 2002007435 A | 1/2002 |
| JP | 2002109150 A | 4/2002 |
| JP | 2005302040 A | 10/2005 |
| JP | 2008102736 A | 5/2008 |
| JP | 2011242851 A | 12/2011 |
| JP | 2011257812 A | 12/2011 |
| JP | 2012059173 A | 3/2012 |
| JP | 2013152656 A | 8/2013 |
| JP | 2013164724 A | 8/2013 |
| JP | 2013182498 A | 9/2013 |
| JP | 2013542478 A | 11/2013 |
| JP | 2015075970 A | 4/2015 |
| WO | WO0065484 A2 | 11/2000 |
| WO | WO2012025493 A1 | 3/2012 |
| WO | WO2012128207 A1 | 9/2012 |
| WO | WO2014208205 A | 12/2014 |
| WO | WO2015045318 A1 | 4/2015 |
| WO | WO2015085916 A1 | 6/2015 |
| WO | WO2015186278 A1 | 12/2015 |
| WO | WO2016017086 A1 | 2/2016 |
| WO | WO2017090475 A1 | 6/2017 |

OTHER PUBLICATIONS

Samorani et al., "Data Mining for Enhanced Operations Management Decision Making: Applications in Health Care", Department of Operations and Information Management, 2012, 159 pages.

Swati Thacker et al., "Oracle Fusion Middleware", Oracle Reports User's Guide to Building Reports 11g Release 1 (11.1), Jul. 31, 2013 (Jul. 31, 2013), XP055659020, Retrieved from the Internet: URL:https:// docs.oracle.com/middleware/11119/classic/build-reports/ B32122-03.pdf [retrieved on Jan. 17, 2020], 776 pages.

Zaman et al., "Modeling and querying multidimensional data sources in Siebel Analytics", SIGMOD 2005: Proceedings of the ACM SIGMOD International Conference On Management of Data; Baltimore, Maryland, Jun. 14-16, 2005, Association for Computing Machinery, New York, NY, Jun. 14, 2005 (Jun. 14, 2005), pp. 822-827 (6 pages).

StatSlice Systems Excel at Data Mining—Connecting to a SQL Data Source, Youtube, Jul. 18, 2014, URL: https://www.youtube.com/watch?v=7RYbDWa9or8, retrieved on Jun. 11, 2019, 1 page.

Nakamura, Shirou et al., "Practical Methods for Constructing Data Warehouse," Nikkei Computer, (non-official translation) Sep. 15, 1997 (Sep. 15, 1997), pp. 237-249.

Generate Near Table, esri, Nov. 20, 2016, retrieved Oct. 11, 2022 from https://web.archive.org/web/20161113175527/http://desktop.arcgis.com/en/aremap/10.3/tools/analysis-toolbox/generate-near-table.htm (3 pages).

Spatial Join, esri, Mar. 18, 2017, retrieved Oct. 11, 2022 from https://web.archive.org/web/20170318121018/http://desktop.arcgis.com/ja/arcmap/10.3/tools/analysis-toolbox/spatial-join.htm (4 pages).

\* cited by examiner

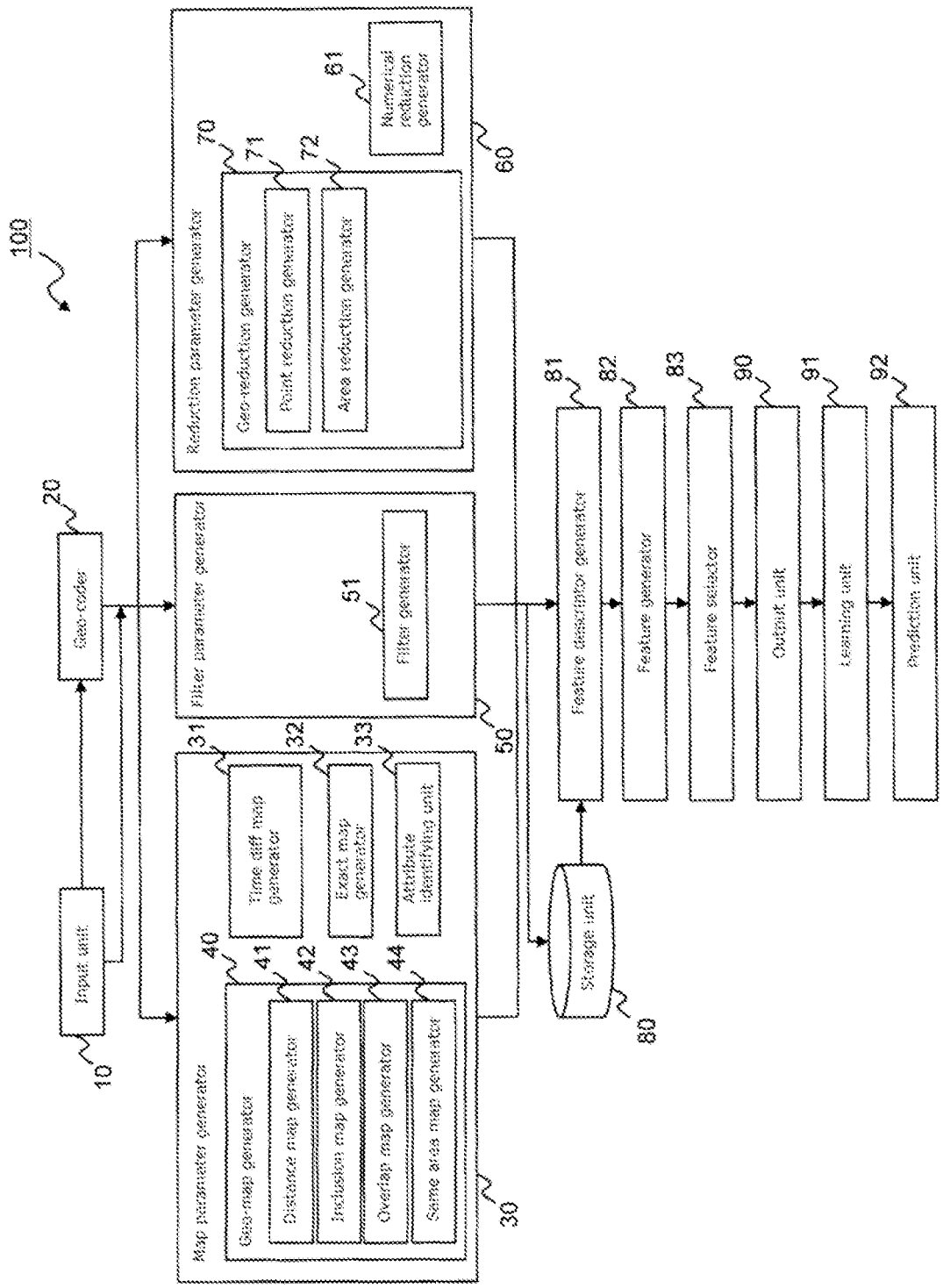

[FIG. 2]
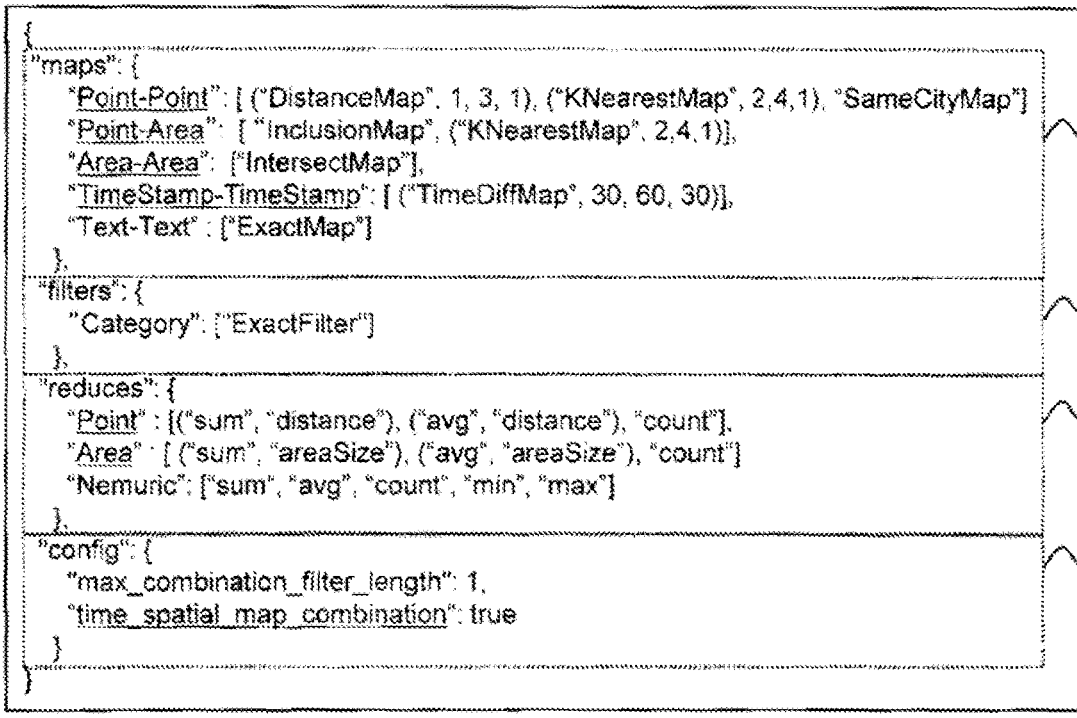

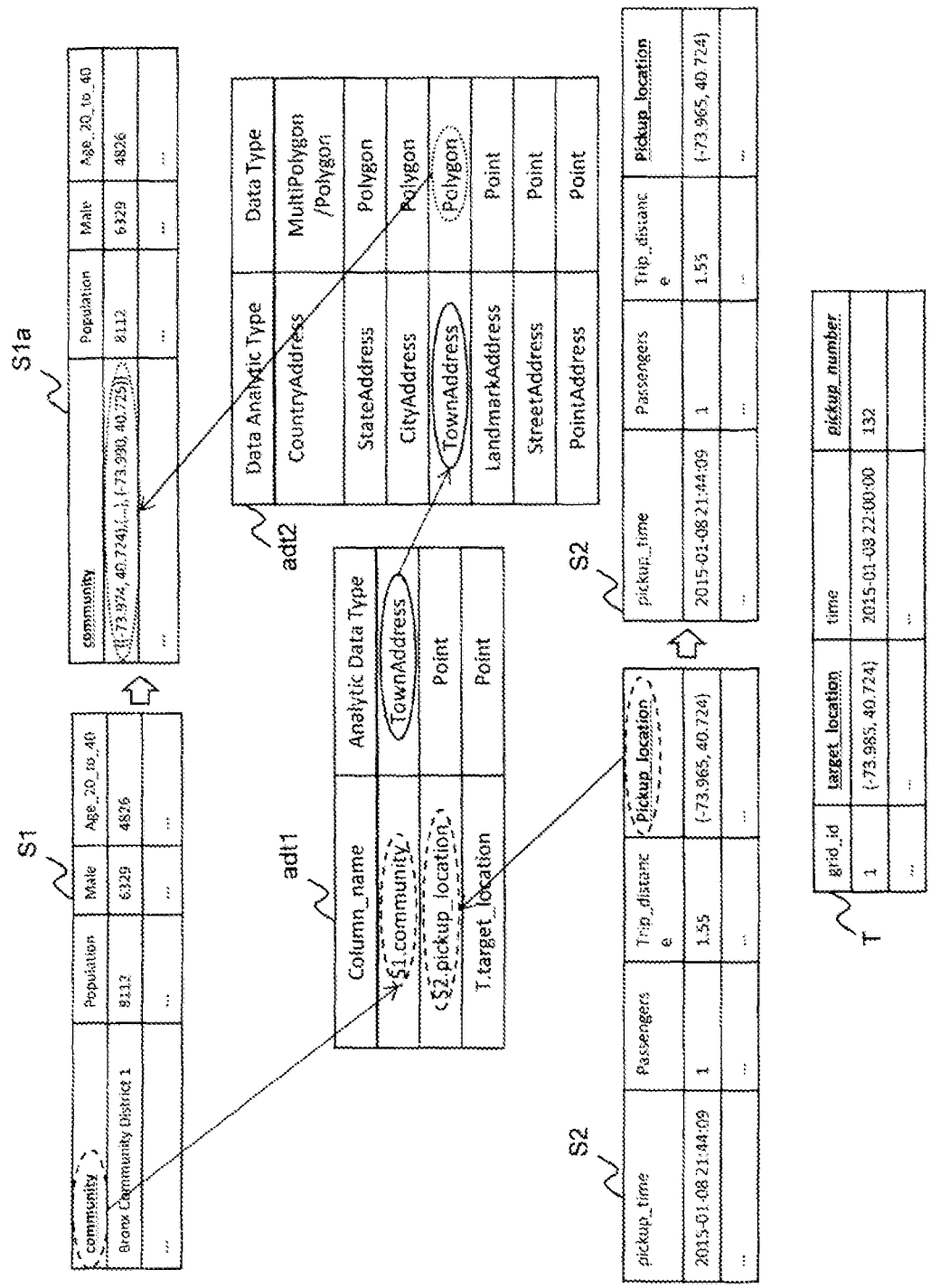
[FIG. 3]

[FIG. 4]
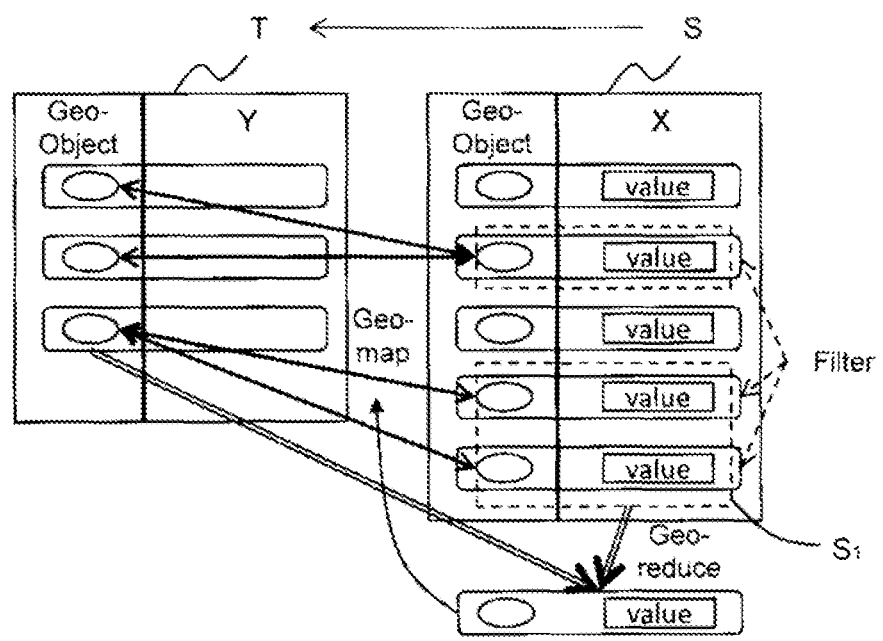

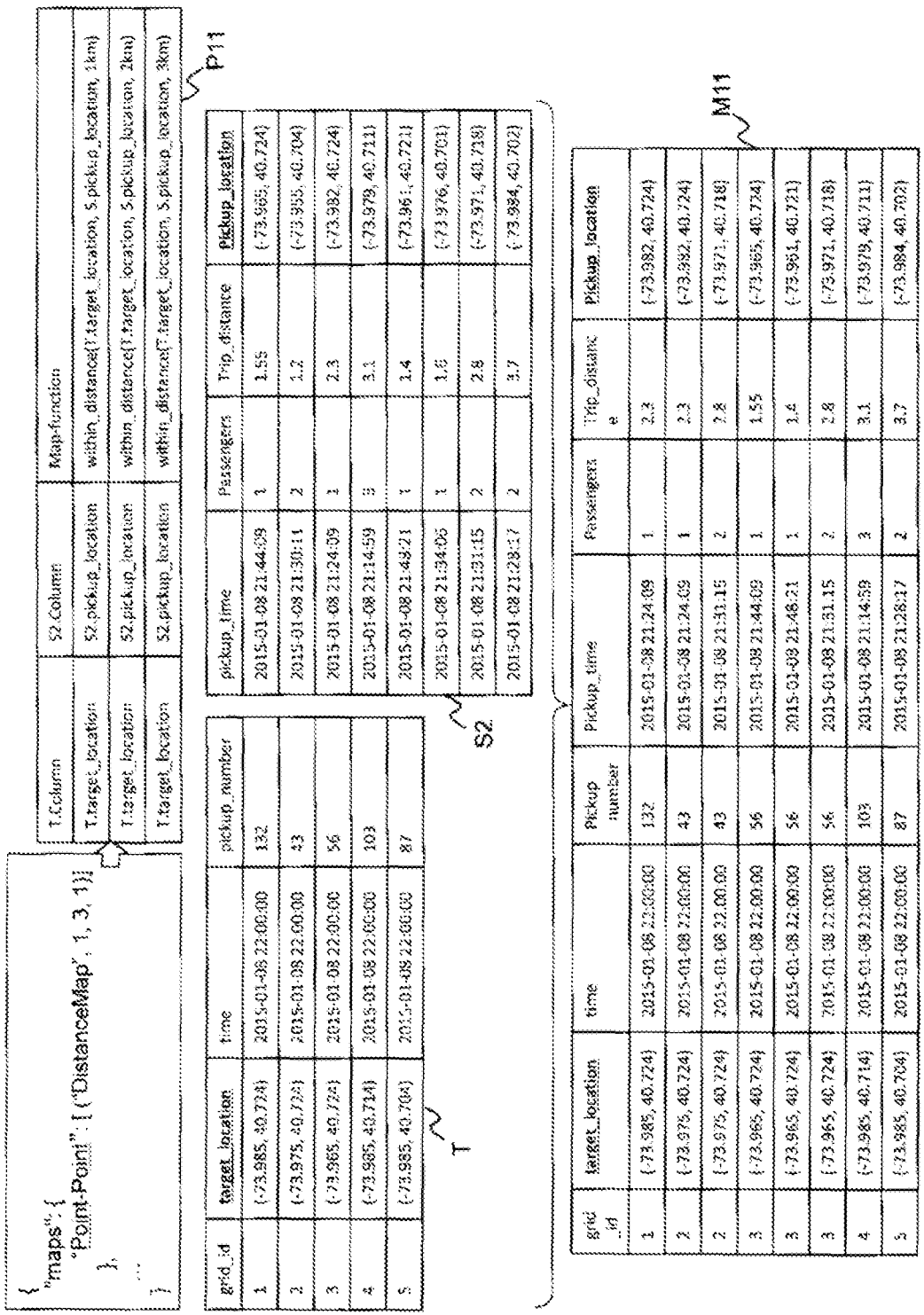
[FIG. 5]

[FIG. 6]

[FIG. 7]
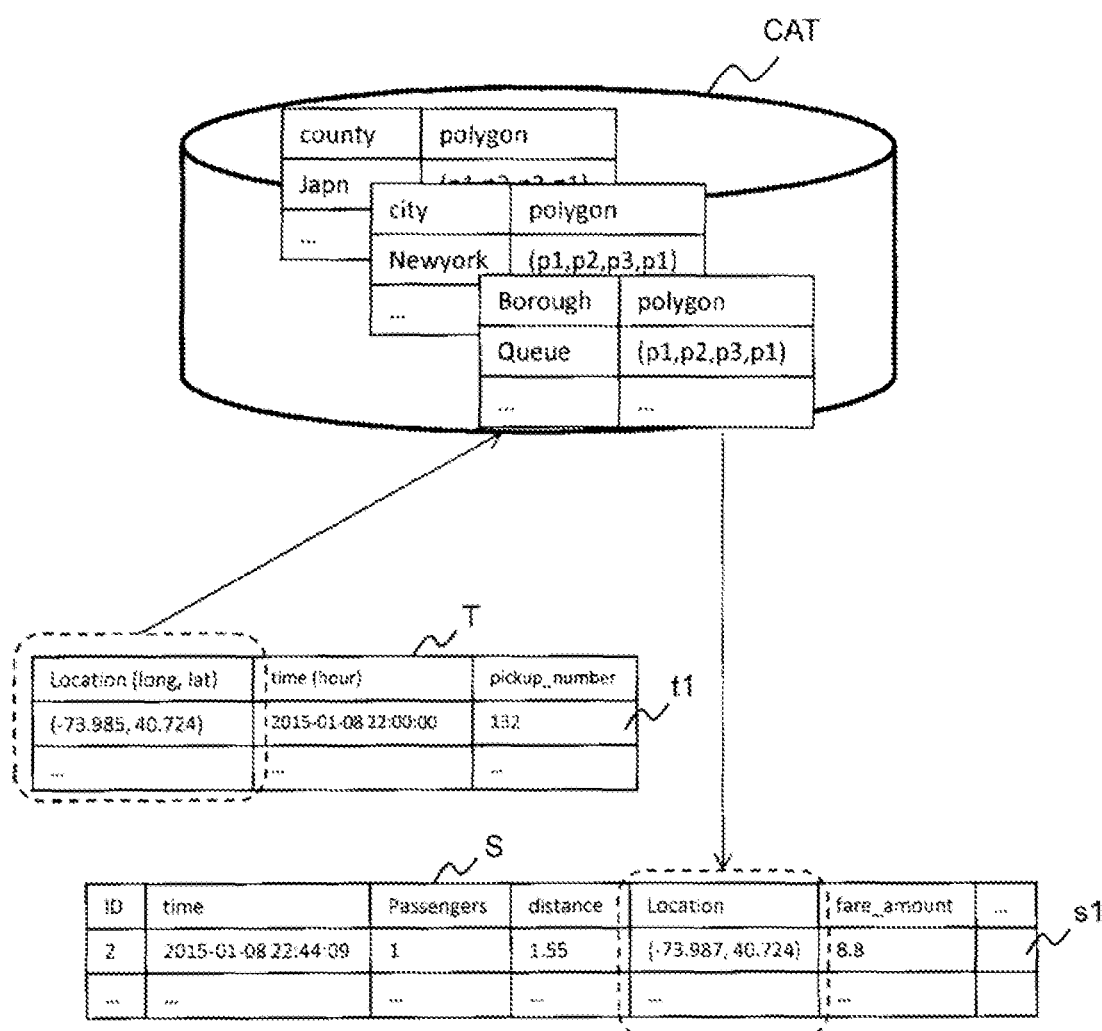

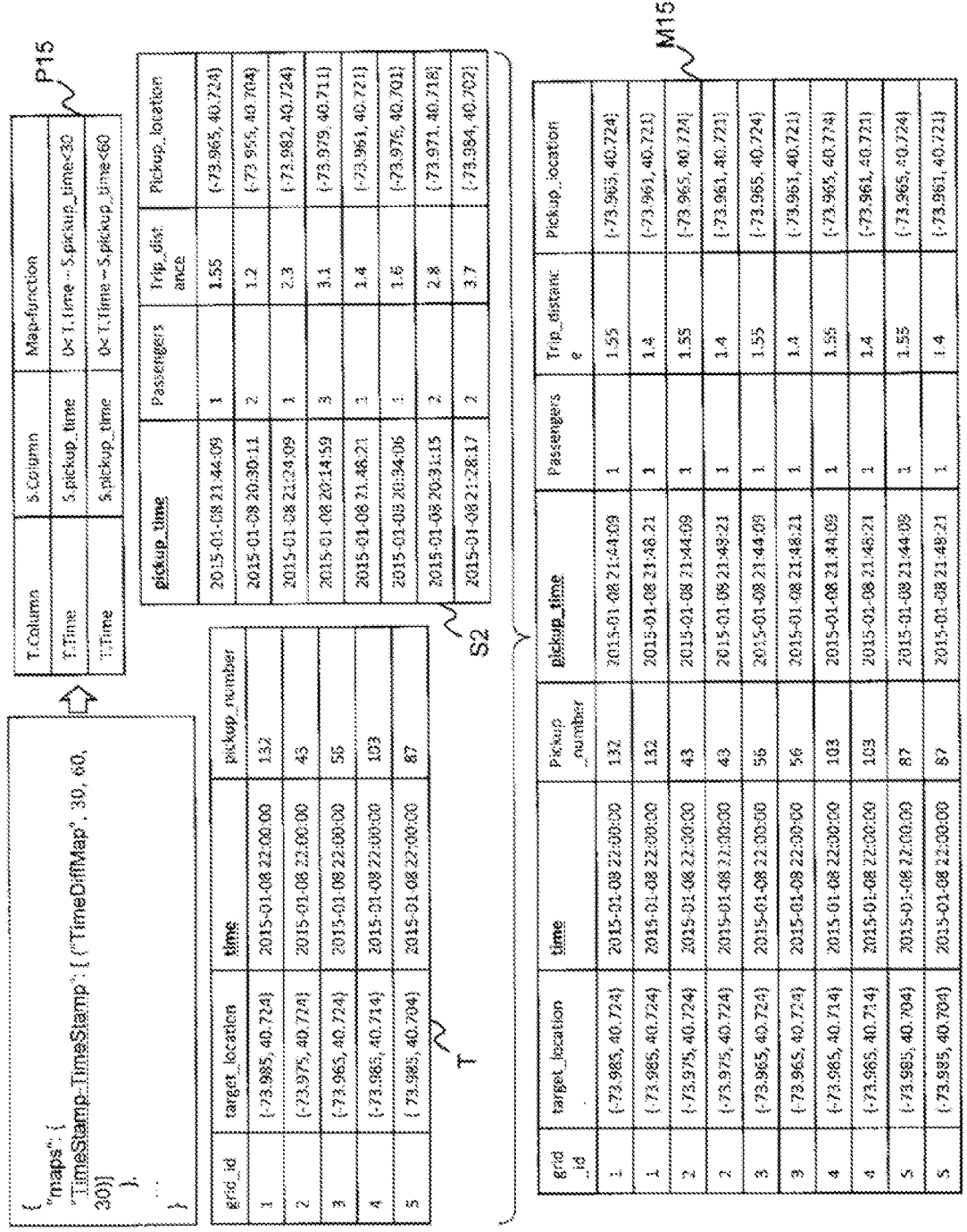
[FIG. 10]

[FIG. 11]
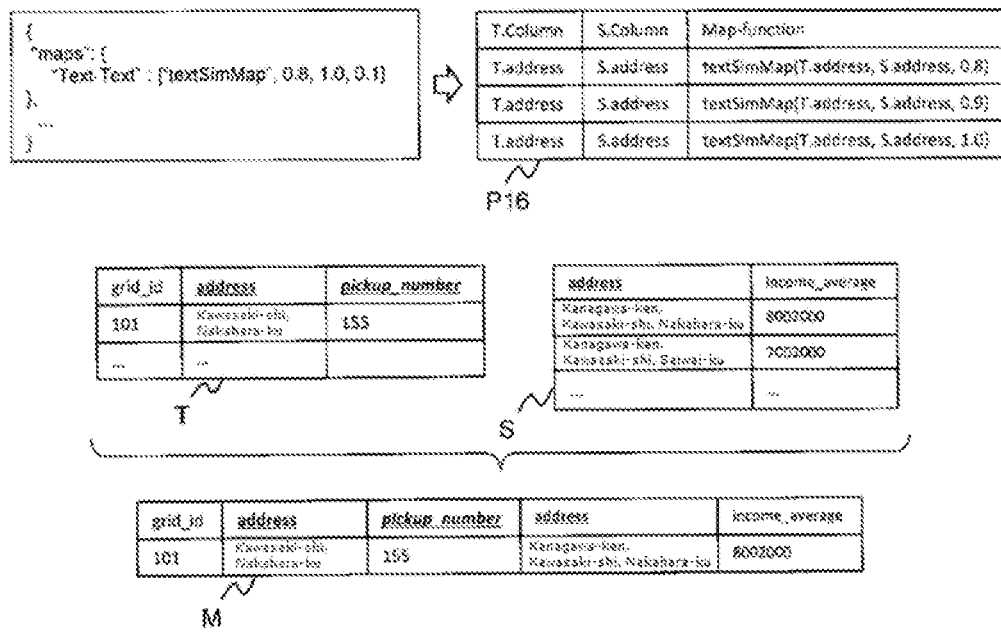
[FIG. 12]
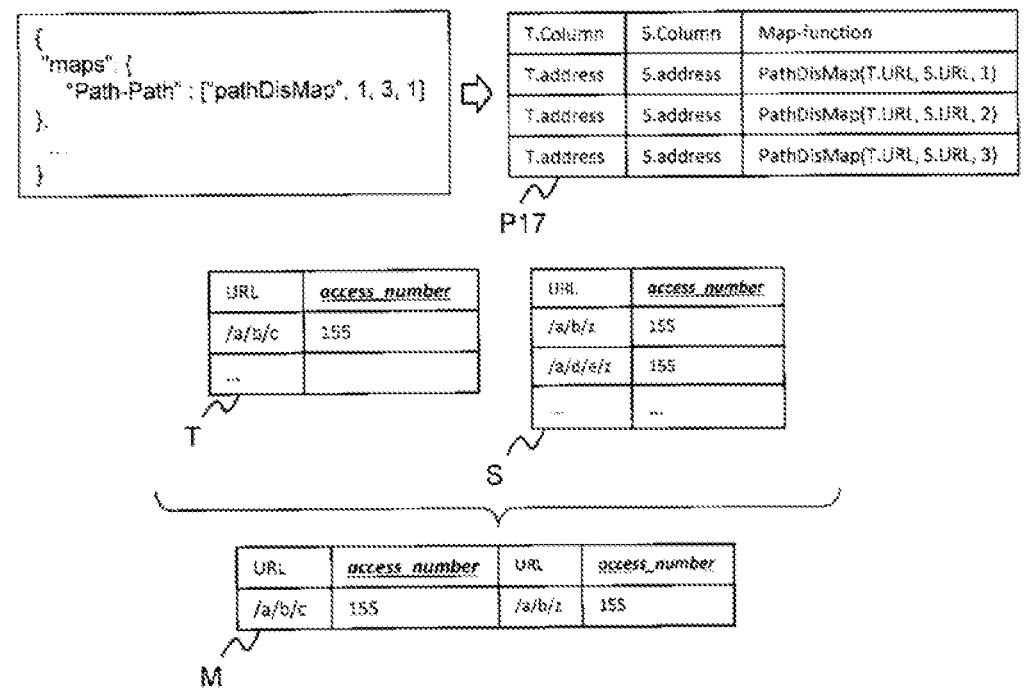

[FIG. 13]

```
"maps": {
  "Point-Point": [ ("DistanceMap", 1, 3, 1),
    ("KNearestMap", 2, 4, 1), ("SameCityMap") ],
  "Point-Area": [ ("InclusionMap", 2, 4, 1) ],
  "Area-Area": ["IntersectMap"],
  "TimeStamp-TimeStamp": [("TimeDiffMap", 30, 60, 30)],
  "Text-Text": ["ExactMap"]
}
```

T:

| | [Point type] | [Timestamp type] | |
|---|---|---|---|
| grid_id | target_location | time | pickup_number |
| 1 | (-73.985, 40.724) | 2015-01-08 23:00:00 | 132 |

S1:

| [Area type] | | |
|---|---|---|
| community | | Population |
| | Male | Age_20 to_40 |
| ((-73.978, 40.724)(...)(-73.980, 40.725)) | 6329 | 4826 |
| | 8112 | |

S2:

| [Timestamp type] | [Point type] | | |
|---|---|---|---|
| pickup_time | Passengers | Trip_distance | Pickup_location |
| 2015-01-08 21:44:09 | 1 | 1.55 | (-73.965, 40.724) |

| T.Column | S.Column | Map-function | |
|---|---|---|---|
| T.target_location | S2.pickup_location | within_distance(T.target_location, S2.pickup_location, 1km) | |
| T.target_location | S2.pickup_location | within_distance(T.target_location, S2.pickup_location, 2km) | |
| T.target_location | S2.pickup_location | within_distance(T.target_location, S2.pickup_location, 3km) | P11 |
| T.target_location | S2.Pickup_location | K_nearest(T.target_location, S2.Pickup_location, 2) | P12 |
| T.target_location | S2.Pickup_location | K_nearest(T.target_location, S2.Pickup_location, 3) | P13 |
| T.target_location | S2.Pickup_location | K_nearest(T.target_location, S2.Pickup_location, 4) | P16 |
| T.target_location | S2.pickup_location | sameCity(S2.pickup_location, T.target_location) | |
| T.target_location | S1.community | K_nearest(T.target_location, S1.community, 2) | |
| T.target_location | S1.community | K_nearest(T.target_location, S1.community, 3) | P14 |
| T.target_location | S1.community | K_nearest(T.target_location, S1.community, 4) | P15 |
| T.target_location | S1.community | Contain(S1.community, T.target_location) | |
| T.Time | S2.pickup_time | 0<T.Time - S2.pickup_time<30 | |
| T.Time | S2.pickup_time | 0<T.Time - S2.pickup_time<60 | |

[FIG. 14]

[FIG. 15]

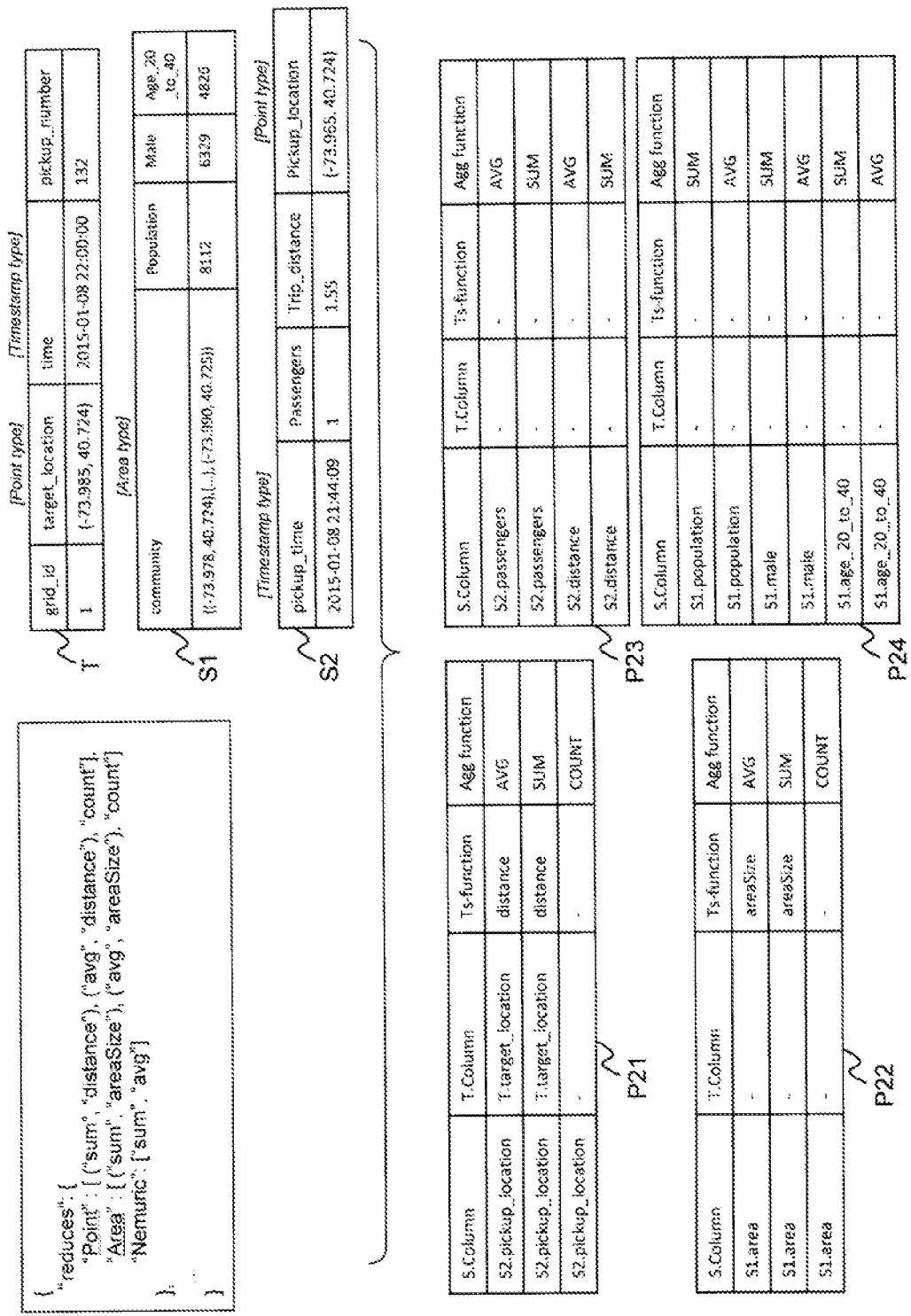
[FIG. 16]

```
{
  "config": {
    "max_combination_filter_length": 1,
    "time_spatial_map_combination": true
  }
}
```

| T.Column | S.Column | Map-function |
|---|---|---|
| T.target_location | S2.pickup_location | within_distance(T.target_location, S2.pickup_location, 1km) |
| T.target_location | S2.pickup_location | within_distance(T.target_location, S2.pickup_location, 2km) |
| T.target_location | S2.pickup_location | within_distance(T.target_location, S2.pickup_location, 3km) |
| T.target_location | S2.Pickup_location | K_nearest(T.target_location, S2.Pickup_location, 2) |
| T.target_location | S2.Pickup_location | K_nearest(T.target_location, S2.Pickup_location, 3) |
| T.target_location | S2.Pickup_location | K_nearest(T.target_location, S2.Pickup_location, 4) |

| T.Column | S.Column | Map-function |
|---|---|---|
| T.Time | S2.pickup_time | 0< T.Time – S2.pickup_time<30 |
| T.Time | S2.pickup_time | 0< T.Time – S2.pickup_time<60 |

P11, P12, P15

| Map conditions |
|---|
| within_distance(T.target_location, S2.pickup_location, 1km) and 0< T.Time – S2.pickup_time<30 |
| ... |
| within_distance(T.target_location, S2.pickup_location, 3km) and 0< T.Time – S2.pickup_time<60 |
| K_nearest(T.target_location, S2.Pickup_location, 2) and 0< T.Time – S2.pickup_time<30 |
| ... |
| K_nearest(T.target_location, S2.Pickup_location, 4) and 0< T.Time – S2.pickup_time<60 |

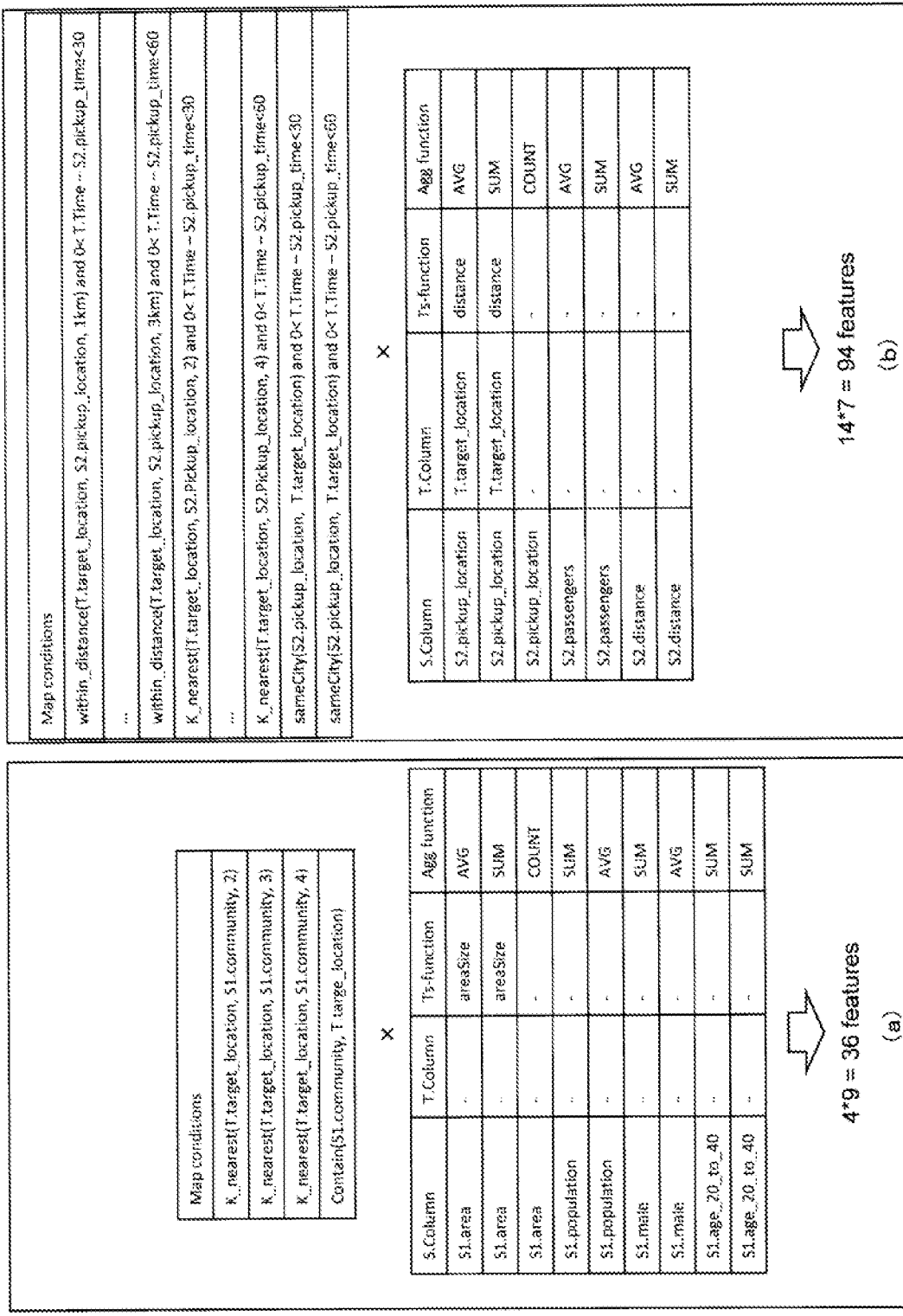
[FIG. 18]

[FIG. 19]
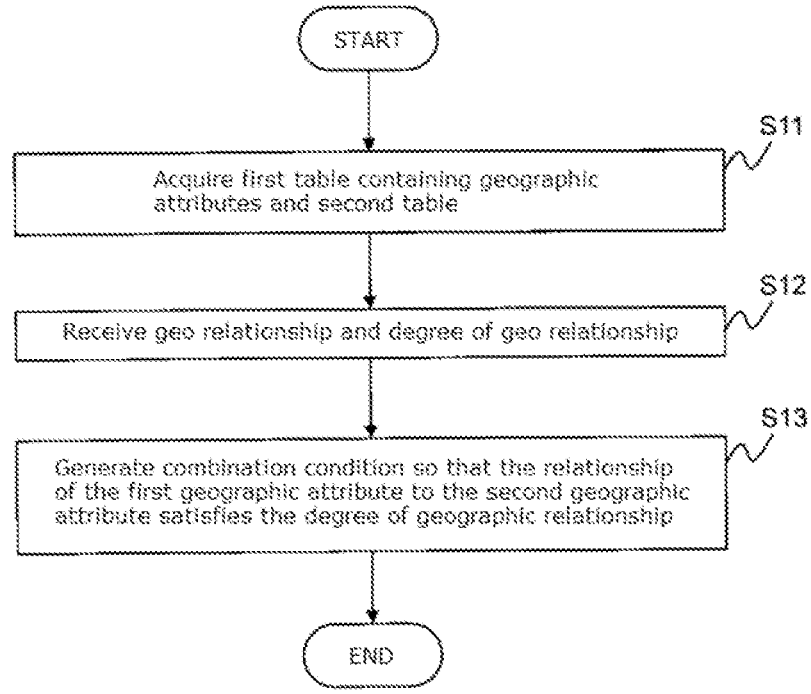
[FIG. 20]
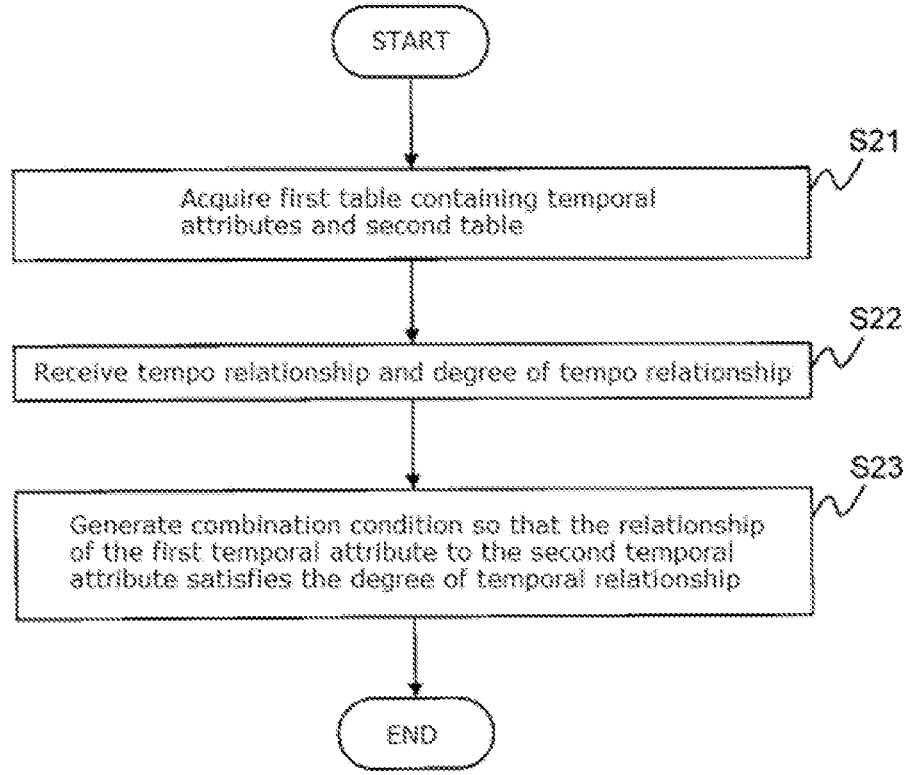

[FIG. 21]
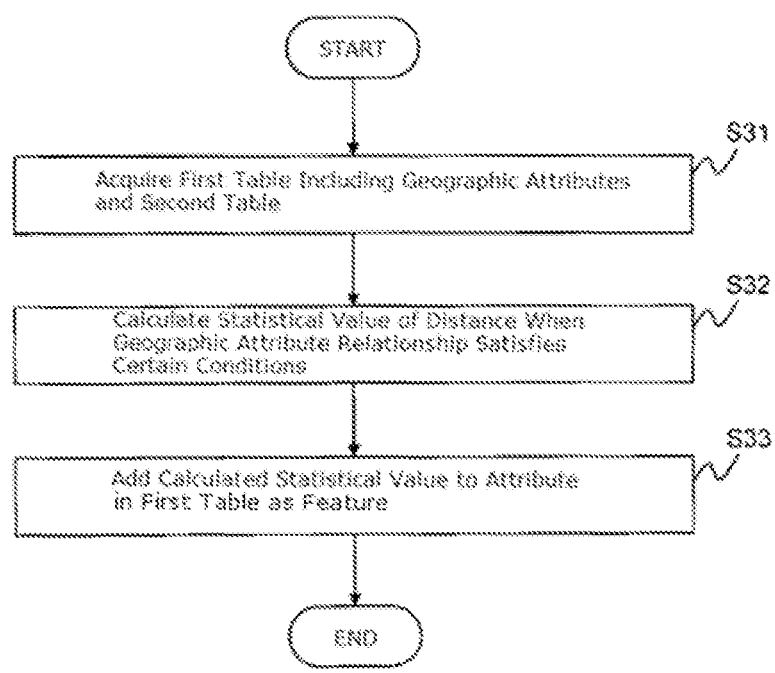
[FIG. 22]
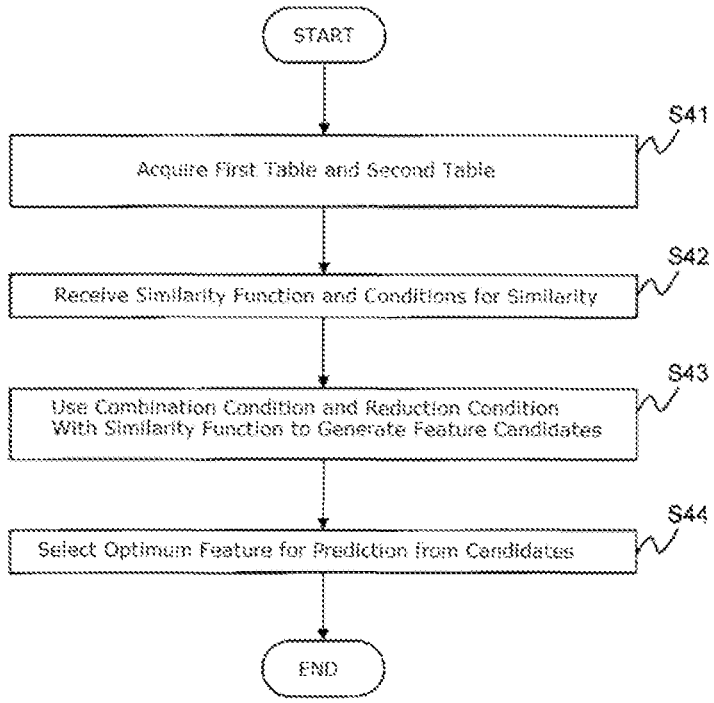

[FIG. 23]
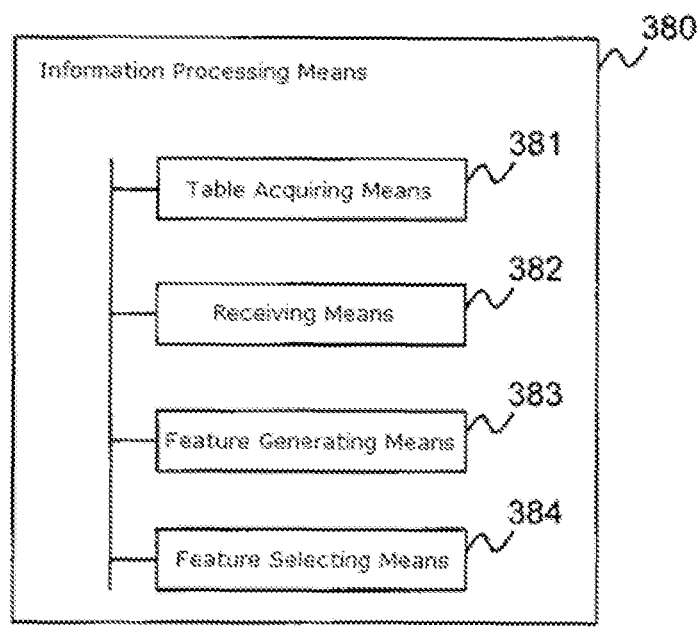
[FIG. 24]
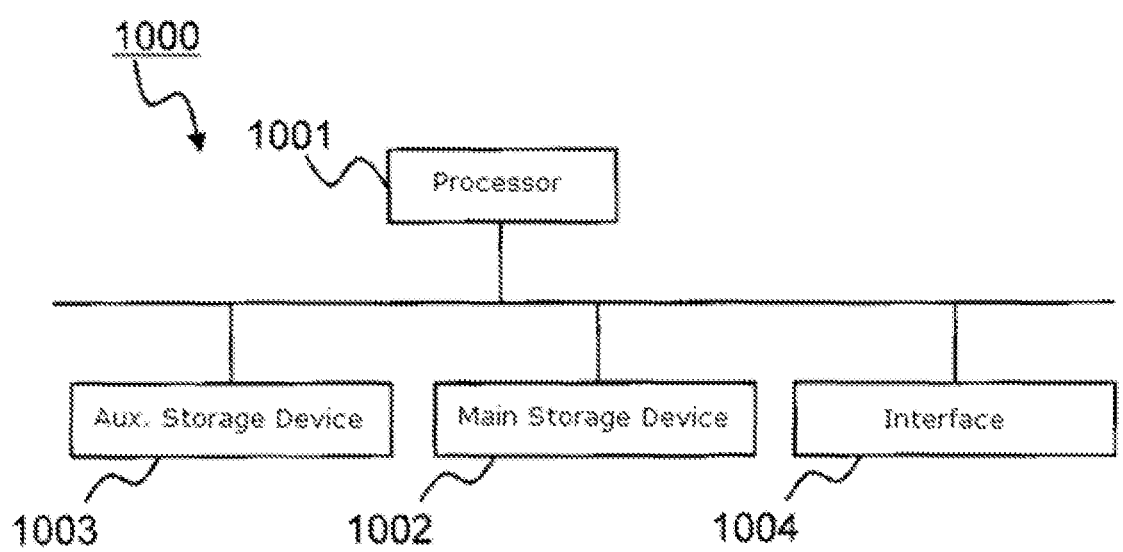

FEATURE VALUE GENERATION DEVICE, FEATURE VALUE GENERATION METHOD, AND FEATURE VALUE GENERATION PROGRAM

TECHNICAL FIELD

The present invention relates to a feature generating device, a feature generating method, and a feature generating program for combining a plurality of tables to generate features.

BACKGROUND ART

Data mining is a technique in which useful knowledge not known before it is found in a large amount of data. A large number of attribute candidates must be generated in order to find useful knowledge not known before. Specifically, a large number of candidates for attributes (explanatory variables) must be generated that can affect the variable being predicted (target variable). By generating a large number of these candidates, the likelihood that predictive attributes will be included among the candidates can be increased.

For example, Patent Document 1 describes the generation of feature candidates used in machine learning by combining target tables including a target variable with source tables not including the target variable. In the method described in Patent Document 1, the processing performed to generate feature candidates is defined using combinations of three conditions, namely, a filter condition, map condition, and reduction condition, to reduce the number of hours of labor that analysts must perform to generate feature candidates.

PRIOR ART DOCUMENTS

Patent Documents

Patent Document 1: WO 2017/090475 A1

SUMMARY OF THE INVENTION

Problem to be Solved by the Invention

The present inventors came up with the idea that prediction accuracy could be improved by using a wide variety of information sources when predicting a target in a given area. In other words, they believed that information is preferably obtained by combining a plurality of related information sources.

For example, Patent Document 1 uses customer IDs in a target table and source table in the combination conditions (that is, map conditions) for the target table and the source table. However, the present inventors discovered that a plurality of candidates for map conditions could be generated depending on the target of analysis. When generating feature candidates to be used on a target of analysis using the method described in Patent Document 1, the processing is complicated. As a result, the amount of labor performed by the analyst is substantial.

It is an object of the present invention to provide a feature generating device, a feature generating method, and a feature generating program that can reduce the amount of labor performed by an analyst to generate features.

Means for Solving the Problem

An aspect of the present invention is a feature generating device comprising: a table acquiring means for acquiring a first table including a prediction target and a first attribute, and a second table including a second attribute; a receiving means for receiving a similarity function and a similarity condition used to calculate the degree of similarity between the first attribute and the second attribute; a feature generating means for generating feature candidates from the first table and the second table able to affect the prediction target using a combination condition for combining a record in the first table including a value for the first attribute and a record in the second table including a value for the second attribute whose degree of similarity calculated from the value of the first attribute and the value of the second attribute using the similarity function satisfies the condition, a reduction method for the plurality of records in the second table, and a reduction condition represented by a column to be reduced; and a feature selecting means for selecting the optimum feature for prediction from among the feature candidates.

Another aspect of the present invention is a feature generating method comprising: acquiring a first table including a prediction target and a first attribute, and a second table including a second attribute; receiving a similarity function and a similarity condition used to calculate the degree of similarity between the first attribute and the second attribute; generating feature candidates from the first table and the second table able to affect the prediction target using a combination condition for combining a record in the first table including a value for the first attribute and a record in the second table including a value for the second attribute whose degree of similarity calculated from the value of the first attribute and the value of the second attribute using the similarity function satisfies the condition, a reduction method for the plurality of records in the second table, and a reduction condition represented by a column to be reduced; and selecting the optimum feature for prediction from among the feature candidates.

Another aspect of the present invention is a feature generating program causing a computer to execute: a table acquiring process for acquiring a first table including a prediction target and a first attribute, and a second table including a second attribute; a receiving process for receiving a similarity function and a similarity condition used to calculate the degree of similarity between the first attribute and the second attribute; a feature generating process for generating feature candidates from the first table and the second table able to affect the prediction target using a combination condition for combining a record in the first table including a value for the first attribute and a record in the second table including a value for the second attribute whose degree of similarity calculated from the value of the first attribute and the value of the second attribute using the similarity function satisfies the condition, a reduction method for the plurality of records in the second table, and a reduction condition represented by a column to be reduced; and a feature selecting process for selecting the optimum feature for prediction from among the feature candidates.

Effects of the Invention

The technical means of the present invention have the technical effect of being able to reduce the amount of labor performed by an analyst to generate features.

BRIEF DESCRIPTION OF THE DRAWINGS

FIG. 1 is a block diagram of the information processing system in an embodiment of the present invention.

FIG. 2 is a diagram used to explain an example of a configuration file.

FIG. 3 is a diagram used to explain an example of data conversion processing.

FIG. 4 is a diagram used to explain an example of the relationship of each parameter with a first table and a second table.

FIG. 5 is a diagram used to explain an example of processing performed to generate map parameters based on distance.

FIG. 6 is a diagram used to explain another example of processing performed to generate map parameters based on distance.

FIG. 7 is a diagram used to explain an example of a method used to determine whether or not attributes are in the same area.

FIG. 8 is a diagram used to explain an example of processing performed to generate map parameters based on whether or not locations are in a common area.

FIG. 9 is a diagram used to explain an example of processing performed to generate map parameters based on an inclusion relationship.

FIG. 10 is a diagram used to explain an example of processing performed to generate map parameters based on time differences.

FIG. 11 is a diagram used to explain an example of processing performed to generate map parameters based on text similarities.

FIG. 12 is a diagram used to explain an example of processing performed to generate map parameters based on structural similarities.

FIG. 13 is a diagram used to explain an example of generated map parameters.

FIG. 14 is a diagram used to explain an example of processing performed to generate reduction parameters for calculating distance statistics.

FIG. 15 is a diagram used to explain an example of processing performed to generate reduction parameters for calculating area statistics.

FIG. 16 is a diagram used to explain an example of generated reduction parameters.

FIG. 17 is a diagram used to explain an example of combined map parameters.

FIG. 18 is a diagram used to explain an example of a method used to combine parameters and generate a feature descriptor.

FIG. 19 is a flowchart showing an example of processing performed to generate combination conditions.

FIG. 20 is a flowchart showing another example of processing performed to generate combination conditions.

FIG. 21 is a flowchart showing an example of processing performed to generate features.

FIG. 22 is a flowchart showing another example of processing performed to generate features.

FIG. 23 is a block diagram showing an overview of a feature generating device of the present invention.

FIG. 24 is a schematic block diagram showing the configuration of a computer related to at least one embodiment.

EMBODIMENT OF THE INVENTION

The following is a description of an embodiment of the present invention with reference to the drawings.

The information processing system in the present embodiment acquires a table including variables for a predicted target (such as target variables) (referred to as the first table below) and a table different from the first table (referred to as the second table below). In the following example, the first table is sometimes referred to as the target table and the second table is sometimes referred to as the source table. The first table and the second table may also include sets of data.

In the present embodiment, the first table and the second table include attributes from a shared perspective. A shared perspective means the semantic content of attribute data is the same. The method used to express the data may be the same or different. In the following explanation, the attributes in the first table are referred to as first attributes and the attributes in the second table are referred to as second attributes.

The shared perspective may be a geographic perspective or a temporal perspective. For example, attribute values from a geographic perspective can be classified as being one of the following four types of geographic data. The description following the colon in the header indicates the syntax of the data.

(1) Point P (Point): $p=(x, y) \in P$

Point P is indicated as (longitude, latitude) coordinates.

(2) Polygon G (Polygon): $g=(b_1, b_2, \ldots, b_n) \in G$

Polygon G is defined by a single outer boundary b1 and zero or more inner boundaries $(b_2, \ldots, b_n)$. Here, $b_1=(p_1, p_2, \ldots, p_n)$ is a boundary of a closed ring defined as an order of three or more points (provided $p_1, p_2, \ldots, p_n \in P$)

(3) Multipolygon M (Multipolygon): $m=(g_1, g_2, \ldots, g_n) \in M$, $g_1, g_2, \ldots, g_n \in G$ A multipolygon M consists of one or more polygons.

(4) String S (String): $s \in S$

This is an address represented by a character string.

The analysis data type may be defined in association with a data type as semantic information related to data analysis. For example, from a geographic perspective, polygons G and multipolygons M may be defined as analysis data types for areas (Area), and points P may be defined as an analysis data type related to points (Point). A character string relating to an address may be defined as an analysis data type relating to, for example, a country, city, town, landmark, street, or point. An analysis data type representing geographic information is sometimes referred to as a geographic data type below.

Also, an attribute type from a time perspective (temporal data type) can be defined as a time stamp (TimeStamp) type.

When the attributes with a shared perspective are geographic attributes, the attributes in the first table are referred to as first geographic attributes and the attributes in the second table are referred to as second geographic attributes. When the attributes with a shared perspective are temporal attributes, the attributes in the first table are referred to as first temporal attributes and the attributes in the second table are referred to as second temporal attributes. Other attributes are described in similar ways. The first geographic attribute may be the primary key in the first table.

In the following examples, the attributes share either a geographic perspective or a temporal perspective. However, the attributes do not have to share a geographic perspective or a temporal perspective. For example, the attributes may share a textual perspective or a structural perspective. The attribute value from a textual perspective may be an address. The attribute value from a structural perspective may be a URL (Uniform Resource Locator) or tree structure path. For the sake of simplicity, the attributes with a shared perspective in the following explanation are primarily geographic attributes and temporal attributes.

FIG. 1 is a block diagram of the information processing system in an embodiment of the present invention. The information processing system 100 in the present embodiment includes an input unit 10, geo-coder 20, map parameter generator 30, filter parameter generator 50, reduction parameter generator 60, storage unit 80, feature descriptor generator 81, feature generator 82, feature selector 83, output unit 90, learning unit 91, and predicting unit 92.

The input unit 10 acquires a first table and a second table. Because the input unit 10 acquires these tables, the input unit 10 can be referred to as the table acquiring means. The input unit 10 may acquire a plurality of second tables. When the first table and the second table are stored by the storage unit 80, the input unit 10 may acquire the first table and the second table from the storage unit 80. The input unit 10 may also acquire the first table and the second table from another system or storage unit via a communication network (not shown).

When a geographic perspective is shared, the input unit 10 may acquire a first table including prediction targets and first geographic attributes and a second table including second geographic attributes. When a temporal perspective is shared, the input unit 10 may acquire a first table including prediction targets and first temporal attributes and a second table including second temporal attributes. The input unit 10 may acquire a first table including prediction targets and first textual attributes and a second table including second textual attributes, or a first table including prediction targets and first structural attributes and a second table including second structural attributes. Structural attributes will be described later.

The input unit 10 also receives a function for calculating the degree of similarity between a first attribute and a second attribute (referred to below as the similarity function) and a condition for determining the similarity between the value of a first attribute and the value of a second attribute when there is a certain degree of similarity (referred to below as the similarity condition). The similarity function may be expressed as an equation or as a parameter. Also, the similarity condition may be expressed as a threshold value for determining whether or not there is similarity based on the degree of similarity (referred to simply as the similarity threshold value below) or may be expressed as an equation for outputting whether or not there is a similarity based on a parameter, etc.

When a geographic perspective is shared, the input unit 10 receives the geographic relationship as a similarity function and receives a similarity threshold value indicating the degree of geographic relationship as a condition. In other words, when the first attribute and the second attribute are geographic attributes, the similarity function can be defined as a function that calculates a higher degree of similarity when the distance is closer.

When a temporal perspective is shared, the input unit 10 receives the temporal relationship as a similarity function and receives a similarity threshold value indicating the degree of temporal relationship as a condition. In other words, when the first attribute and the second attribute are temporal attributes, the similarity function can be defined as a function that calculates a higher degree of similarity when the time difference is smaller.

When a textual perspective is shared, the input unit 10 receives the textual relationship as a similarity function and receives a similarity threshold value indicating the degree of textual relationship as a condition. In other words, when the first attribute and the second attribute are textual attributes, the similarity function can be defined as a function that calculates a higher degree of similarity when there is a greater match between the two texts. The Simpson coefficient for morphemes can be used to determine the textual similarity.

morph (a) is defined as the set of morphemes in text string a. For example, the following four text strings indicating an address can be expressed as a set of morphemes.

morph('Kawasaki-shi, Nakahara-ku')={'Kawasaki', 'shi', 'Nakahara', 'ku'} morph('Kanagawa-ken, Kawasaki-shi, Nakahara-ku') ={'Kanagawa', 'ken', 'Kawasaki', 'shi', 'Nakahara', 'ku'} morph('Kanagawa-ken, Kawasaki-shi, Saiwai-ku') ={'Kanagawa', 'ken', 'Kawasaki', 'shi', 'Saiwai', 'ku'} morph('Kanagawa-ken, Yokohama-shi, Konan-ku') ={'Kanagawa', 'ken', 'Yokohama', 'shi', 'Konan', 'ku'}

The function textSim (a, b) used to calculate the degree of similarity between text string a and text string b can be defined using Equation 1 below.

$$\text{textSim}(a,b) = |\text{morph}(a) \cup \text{morph}(b)| / \min(|\text{morph}(a)|, |\text{morph}(b)|) \quad \text{(Equation 1)}$$

Here, the degree of similarity between the text strings for the addresses in the examples provided above is calculated in the following way.

textSim('Kawasaki-shi, Nakahara-ku', 'Kanagawa-ken, Kawasaki-shi, Nakahara-ku')=4/4=1.0 textSim('Kawasaki-shi, Nakahara-ku', 'Kawasaki-shi, Saiwai-ku')=3/4=0.75 textSim('Kawasaki-shi, Nakahara-ku', 'Kanagawa-ken, Yokohama-shi, Konan-ku')=2/4=0.5

When a structural perspective is shared, the input unit 10 receives the structural relationship as a similarity function and receives a similarity threshold value indicating the degree of structural relationship as a condition. A character string in which tree structure information such as the directory structure for an address or file is expressed using forward slashes is defined as a path string below. For example, the address 'Kanagawa-ken, Kawasaki-shi' is expressed by the path string 'Kanagawa-ken/Kawasaki-shi'. The directory structure 'news→economy→bigdata' is expressed by the path string 'news/economy/bigdata'.

When the first attribute and the second attribute are structural attributes defined by the path string mentioned above, the similarity function can be defined as a function that calculates a higher degree of similarity when there is a closer distance between the two path strings. For example, the distance coefficient for path strings can be the minimum value for the distance to the lowest common ancestor (LCA) node.

The lowest common ancestor node is the same node that first appears when tracing from the lowest node represented by each of two paths in the upper (ancestor) direction. The distance to the lowest common ancestor node is the number of nodes when tracing from the lowest node to the lowest common ancestor node.

Take, for example, the two path character strings '/a/b/c' and '/a/b/z'. Here, the lowest common ancestor node of the two paths is 'a/b'. The distance from '/a/b/c' to '/a/b' is 1 and the distance from '/a/b/z' to '/a/b' is 1.

Take, also, the two path character strings '/a/b/c' and '/a/d/e/z'. Here, the lowest common ancestor node of the two paths is '/a'. The distance from '/a/b/c' to '/a' is 2 and the distance from '/a/d/e/z' to '/a' is 3.

When the function representing the distance for path character string is pathDis (x, y), the distance for the path character strings described above are calculated as follows.

pathDis('/a/b/c','/a/b/z')=1
pathDis('/a/b/c','/a/d/e/z')=2

FIG. 2 is a diagram used to explain an example of a configuration file (referred to as a config file below). In the example shown in FIG. 2, the similarity function and similarity condition are set in a configuration file (config file below). The input unit 10 may receive the config file.

Portion C1 in the config file shown in FIG. 2 shows the similarity function and similarity condition. Portions C2 to C4 in the config file are described later. In portion C1, the first part (before the colon) shows the correspondence between the data type of the first attribute (more specifically, the analysis data type) and the data type of the second attribute (more specifically, the analysis data type). The later part (after the colon) shows the similarity function and the condition (similarity threshold value). The contents are described in greater detail later.

The "Point-Point" line in portion C1 defines the geographic relationship indicating the distance between a first geographic attribute represented by a point and a second geographic attribute represented by a point.

"DistanceMap" is a map function that defines the degree of the geographic relationship, and includes a distance threshold as a parameter. The three parameters in the DistanceMap function indicate in successive order the "start value," the "end value," and the "interval" (the threshold value applied from the start value to the end value). When the unit of distance is km, ("DistanceMap," 1, 3, 1) in FIG. 2 represent the three threshold values ("distance within 1 km," "distance within 2 km," and "distance within 3 km") applied to the function.

"KNearestMap" is a map function that defines the degree of geographic relationship, and includes a threshold value for the number of nearby geographic information items as a parameter. The three parameters in the KNearestMap function similarly indicate the "start value," the "end value," and the "interval" (the threshold value applied from the start value to the end value). In the example shown in FIG. 2, ("KNearestMap," 3, 5, 1) indicates that the number of nearby geographic information items applied to the function are the three threshold values "within 3," "within 4," and "within 5."

"SameCityMap" is a map function that defines the degree of geographic relationship, and is a function that determines whether two points are included in the same area. While the SameCityMap function does not include a parameter, it determines whether or not the points are included in the same area based on area information defining the area. Area information is defined in advance.

The "Point-Area" line in portion C1 defines the geographic relationship indicating the distance between a first geographic attribute represented by a point and a second geographic attribute represented by an area.

"InclusionMap" is a map function that defines the degree of geographic relationship, and determines whether the first geographic attribute represented by a point is included in the second geographic attribute represented by an area. InclusionMap does not include a parameter.

"KNearestMap" is also defined in the "Point-Area" line. The content of the KNearestMap function is the same as the KNearestMap function in "Point-Point."

The "Area-Area" line in portion C1 defines the geographic relationship indicating the distance between a first geographic attribute represented by an area and a second geographic attribute represented by an area.

"Intersect Map" is a map function that defines the degree of geographic relationship, and determines whether the first geographic attribute represented by an area intersects with the second geographic attribute represented by an area. IntersectMap does not include a parameter.

As indicated above, the first geographic data type and the second geographic data type may be the same geographic data type or may be different geographic data types. The first geographic data type may be a type of data able to specify geography using point information, and the second geographic data type may be a type of data able to specify geography using range information.

The "TimeStamp-TimeStamp" line in portion C1 defines the temporal relationship indicating the difference between a first temporal attribute and a second temporal attribute.

"TimeDiffMap" is a map function that defines the degree of temporal relationship, and includes a threshold value for time difference as a parameter. The three parameters in the TimeDiffMap function indicate the "start value," the "end value," and the "interval" (the threshold value applied from the start value to the end value). When the unit of time is minutes, ("TimeDiffMap," 30, 60, 30) in FIG. 2 represent the two threshold values ("time difference within 30 minutes," "time difference within 60 minutes") applied to the function.

The "Text-Text" line in portion C1 defines the matching relationship between a first attribute representing a character string and a second attribute representing a character string. "ExactMap" is a function for determining whether or not the attributes represented by character strings match.

A similarity relationship between a first attribute representing a character string and a second attribute representing a character string may also be defined in the "Text-Text" line. Specifically, a map function "textSimMap" that defines the degree of the relationship between the character strings may be set in the "Text-Text" line. "TextSimMap" is a map function that defines the degree of relationship between character strings, and includes a threshold value for similarity as a parameter. As in the DistanceMap function, the textSimMap function has three parameters indicating in successive order the "start value," the "end value," and the "interval" (the threshold value applied from the start value to the end value).

Take, for example, [("textSimMap," 0.8, 1.0, 0.1] defined using the textSimMap function. This indicates that three thresholds of "similarity of 0.8 or more," "similarity of 0.9 or more," and "similarity of 1.0 or more" are applied to the function.

Note that the method used to set the similarity function and the threshold value for similarity is not limited to the contents shown in portion C1 of FIG. 2. For example, a structural relationship "Path-Path" may be defined in the configuration file that represents the distance between a first structural attribute represented by a path character string and a second structural attribute represented by a path character string.

Specifically, map function "pathDisMap" that defines the degree of structural relationship may be set in the "Path-Path" line. "pathDisMap" is a map function that defines the degree of structural relationship, and includes a distance threshold as a parameter. As in the DistanceMap function, the pathDisMap function has three parameters indicating in successive order the "start value," the "end value," and the "interval" (the threshold value applied from the start value to the end value).

Take, for example, [("pathDisMap," 1, 3, 1] defined using the pathDisMap function. This indicates that three thresholds of "distance of 1 or less," "distance of 2 or less," and "distance of 3 or less" are applied to the function.

When a config file shown in FIG. 2 is received by the input unit 10, the map parameter generator 30 described later generates a combination condition (map parameter) for combining a record in the first table with a record in the second table.

The input unit 10 may also receive the attributes of the data in each column of the table.

The geo-coder 20 converts attribute data represented by a character string. For example, when geographic attribute data is represented by a character string, the geo-coder 20 converts the character string into point, polygon, or multi-polygon data. When there is no need to convert data, the information processing system 100 does not require a geo-coder 20.

FIG. 3 is a diagram used to explain an example of data conversion processing. In the example shown in FIG. 3, table adt1 defining the analysis data type for each column and table adt2 defining the corresponding data type for conversion from the analysis data type are acquired in advance.

In this situation, the input unit 10 acquires target table T, source table S1, and source table S2 shown in FIG. 3. The analysis data type for the "Pickup_location" column in source table S2 is Point when referring to table adt1, and does not have to be converted. The analysis data type for the "community" column in source table S1 is "TownAddress" when referring to the table adt1, and has to be converted to the Polygon data type when referring to table adt2. Therefore, the geo-coder 20 converts the data in the "community" column of source table S1 so that the data is represented by a polygonal area. Here, for example, area information that can specify a region using a polygon may be determined in advance for the content of "community," and the geo-coder 20 may convert data based on the area information so that the data type becomes a Polygon.

The map parameter generator 30, the filter parameter generator 50, and the reduction parameter generator 60 generate parameters to be used by the feature descriptor generator 81 described later to generate a feature descriptor for generating a feature serving as a variable that can affect a prediction target.

In the following explanation, a feature refers to the content of the feature itself (such as "population" or "location"). A feature vector (or feature table with more than one vector) is obtained by applying specific data to the feature (such as population="8112" or location="(−73.965, 40.724)").

A feature generated by the feature generator 82 described later is a candidate for an explanatory variable when a model is generated using machine learning. In other words, a feature descriptor generated in the present embodiment can be used to automatically generate candidates for explanatory variables when a model is generated using machine learning.

FIG. 4 is a diagram used to explain an example of the relationship of each parameter with a first table and a second table.

The parameter generated by the filter parameter generator 50 is a parameter representing an extraction condition for a row in the second table. This parameter is referred to as a filter parameter below, and the process of extracting a row from the second table based on a filter parameter is sometimes called "filtering." A list of extraction conditions is sometimes called an "F list." An extraction condition can be used, including, for example, a condition for determining whether a value is the same as (or larger or smaller than) a value in the designated column.

The parameter generated by the reduction parameter generator 60 is a parameter indicating the reduction method used to reduce the data in each row of the second table by each target variable. The rows in the first table and the rows in the second table often have a one-to-many correspondence. As a result, the rows are reduced. The reduction information may be defined as a reduction function for columns in a source table (second table).

Any reduction method can be used. Examples include the total number of columns, the maximum value, the minimum value, the average value, the median value, and the distribution. The total of the total number of columns may be calculated from any perspective to include or exclude duplicate data.

This parameter is referred below to as the reduction parameter, and the process used to reduce data in each column using the method indicated by the reduction parameter is referred to as the reduction process. The process used to reduce geographic information is a geo-reduction process. The reduction processing list is sometimes referred to as the "R list." The process of reducing geographic information will be described later in greater detail.

The parameter generated by the map parameter generator 30 is a parameter representing the condition for the correspondence between the columns of the first table and the columns of the second table. This parameter is referred to as the map parameter below, and the process of associating columns in each table based on the map parameter is sometimes referred to as mapping. The list of conditions for correspondence is sometimes referred to as the "M list." The process of associating geographic information is sometimes referred to as geo-mapping. The association of the columns in each table by mapping can be said to entail combining (joining) a plurality of tables into a single table using associated columns. The process of associating geographic information will be described later in greater detail.

The map parameter generator 30 includes a geo-map generator 40, TimeDiff map generator 31, exact map generator 32, and attribute specifying unit 33. The map parameter generator 30 (more specifically, each generator in the map parameter generator 30) generates the combination condition for combining records from a first table that contain the value of a first attribute with records from a second table that contain the value of a second attribute so that the similarity calculated using the value of the first attribute and the value of the second attribute satisfies the condition. Satisfying the condition means the similarity is at or below a threshold value or within a predetermined range.

The geo-map generator 40 generates a parameter indicating the condition for correspondence between columns of the first table and the second table including geographic attributes. The geo-map generator 40 has a distance map generator 41, an inclusion map generator 42, an overlap map generator 43, and a same area map generator 44.

The geo-map generator 40 (more specifically, each generator in the geo-map generator 40) generates the combination condition (map parameter) for combining records contained in the first table with records contained in the second table so that the relationship between the value of a first geographic attribute and the value of a second geographic attribute satisfy the degree of geographic relationship. The processing performed by each generator will be described below in greater detail.

The distance map generator 41 generates a map parameter when the similarity and a condition (such as a similarity threshold value) have been received for associating the first table and the second table based on proximity in distance. In the example shown in FIG. 2, this corresponds to the DistanceMap function or the KNearestMap function being set in the config file.

The distance map generator 41 generates a map parameter for combining records contained in the first table with records contained in the second table so that the value of a first geographic attribute and the value of the second geographic attribute are at or below a threshold value.

FIG. 5 is a diagram used to explain an example of processing performed to generate map parameters based on distance. In the example shown in FIG. 5, the target table T and one of the source tables S2 are acquired. The target table T in FIG. 5 includes data representing the number of passengers picked up at five locations (pickup_number) at 22:00 on Jan. 8, 2015. The source table S2 in FIG. 5 is used to associate and record the number of passengers, distances traveled, and passenger drop-off locations at each time.

In the case of the DistanceMap function shown in FIG. 2, the distance map generator 41 generates a parameter associating each record in the target table T with each record in the source table S2 in which the distance between the location indicated by the value of the first geographic attribute and the location indicated by the value of the second geographic attribute is within 1 km. The distance map generator 41 also generates a parameter associating each record in the target table T with each record in the source table S2 in which the distance between the location indicated by the value of the first geographic attribute and the location indicated by the value of the second geographic attribute is within 2 km and within 3 km.

In the example shown in FIG. 5, the attribute in the "target_location" column of the target table T is the first geographical attribute, and the attribute in the "Pickup_location" column of the source table S2 is the second geographical attribute. These two columns are associated. The columns to be associated in the first table and the second table may be established in advance or specified by the attribute specifying unit 33 described later.

In the example shown in FIG. 5, the attribute in the "target_location" column of the target table T is the first geographical attribute, and the attribute in the "Pickup_location" column of the source table S2 is the second geographical attribute. These two columns are associated. The columns to be associated in the first table and the second table may be established in advance or specified by the attribute specifying unit 33 described later.

Figure 6:
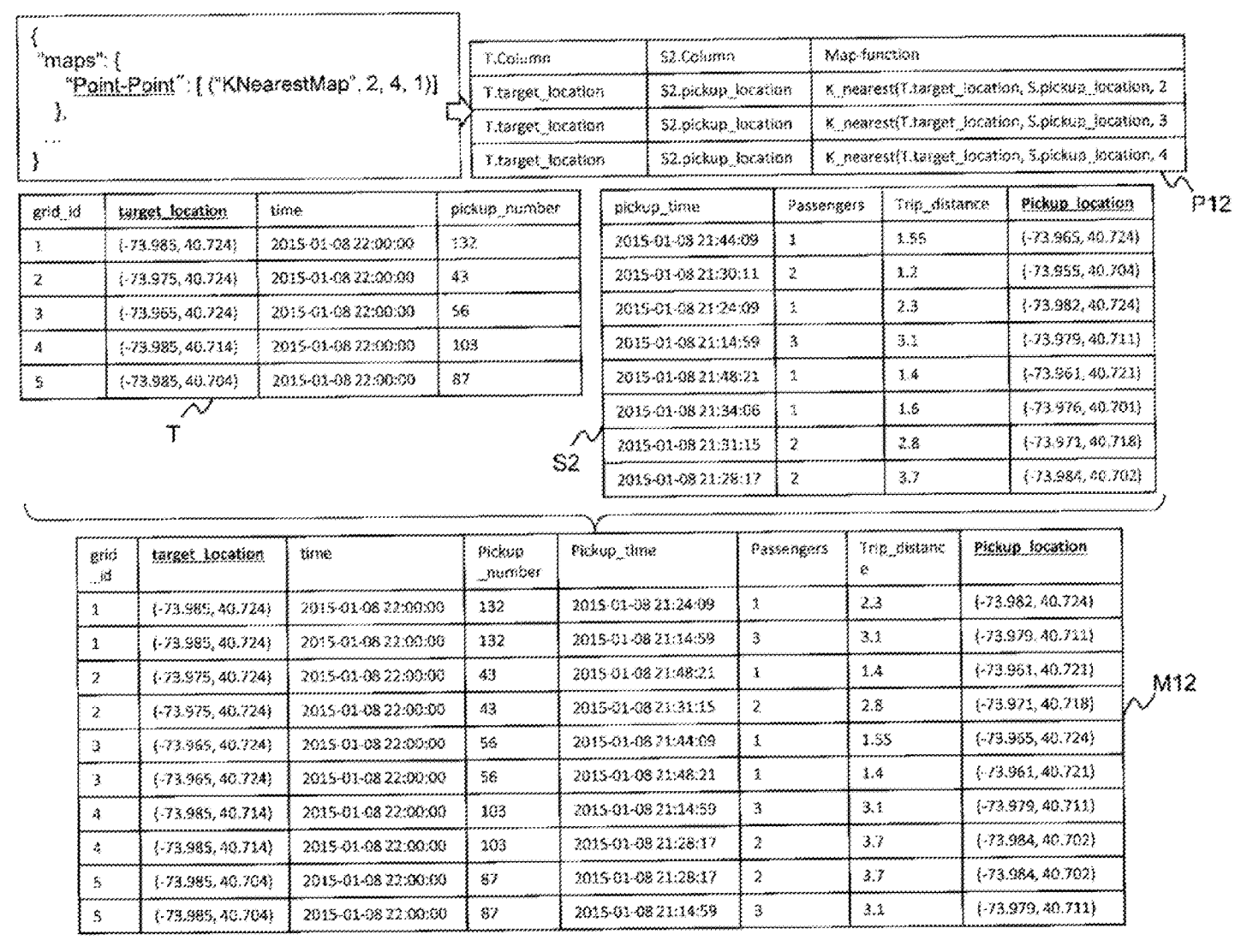

FIG. 6 is a diagram used to explain another example of processing performed to generate map parameters based on distance. The target table T and the source table S2 in FIG. 6 are the same as target table T and the source table S2 in FIG. 5.

In the case of the KNearestMap function shown in FIG. 2, the distance map generator 41 generates a parameter in which each record in the target table T is associated with the two closest records in the source table S2 in ascending order in terms of the distance between the location indicated by the value of the first geographic attribute and the location indicated by the value of the second geographic attribute. The distance map generator 41 also generates parameters in which each record in the target table T is associated with the three closest and the four closest records in the source table S2 in ascending order in terms of the distance between the location indicated by the value of the first geographic attribute and the location indicated by the value of the second geographic attribute.

In the example shown in FIG. 6, the attribute in the "target_location" column of the target table T is the first geographical attribute, and the attribute in the "Pickup_location" column of the source table S2 is the second geographical attribute. These two columns are associated. The columns to be associated in the first table and the second table may be established in advance or specified by the attribute specifying unit 33 described later.

As a result, the parameter P12 shown in FIG. 6 is generated. As shown in FIG. 6, the map parameter is generated based on the geographic analysis data type, and a single map processing operation is defined based on a single map parameter. The map data M12 in FIG. 6 is the result of associating each record in the target table T with the two closest records in the source table S2 in ascending order. In one example, each record in the source table is associated with the two closest records in the target table.

The same area map generator 44 generates a map parameter when a similarity function is received for associating records in the first table and the second table based on whether they are in the same area. In the example shown in FIG. 2, this corresponds to the SameCityMap function being set in the config file.

The same area map generator 44 generates a map parameter for combining a record in the first table with a record in the second table when the location indicated by the value of the first geographic attribute and the location indicated by the value of the second geographic attribute are within the same area.

FIG. 7 is a diagram used to explain an example of a method used to determine whether or not attributes are in the same area. In the example shown in FIG. 7, a common area table CAT is defined beforehand for associating each area with areas specified using polygons. Examples of common areas include countries, provinces, cities, autonomous regions, and neighborhoods. Common areas are defined so as not to overlap and represent boundary information on a map. The common area table CAT may be stored in the storage unit 80.

First, it is determined whether or not two locations are in the same area based on the common area table CAT. Specifically, the area indicated by the location of record t1 in the target table T is identified and it is determined whether or not the location of record s1 in the source table S is within this area. The same processing is then performed on all of the records in the target table T and in the source table S.

Figure 8:
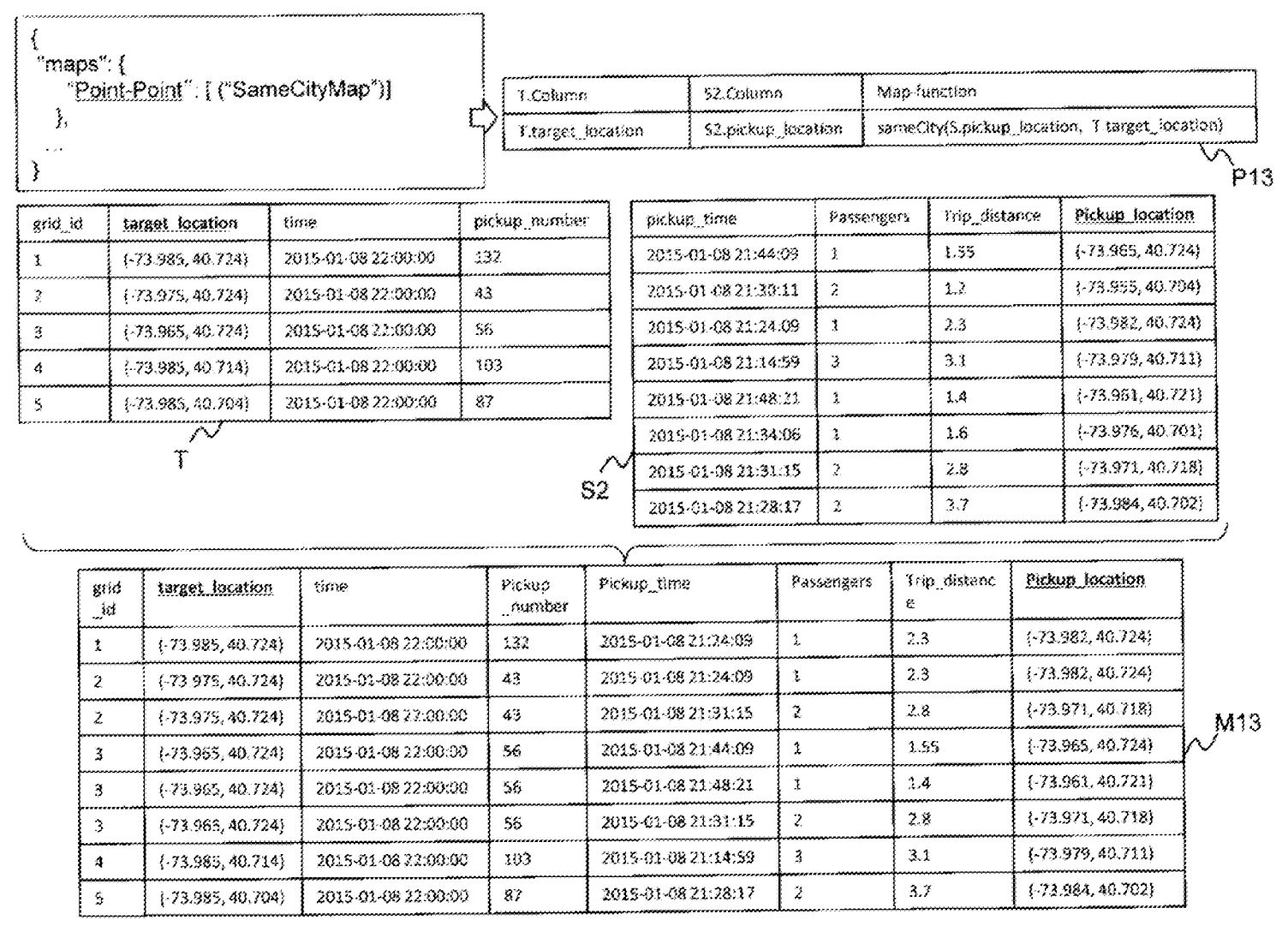

FIG. 8 is a diagram used to explain an example of processing performed to generate map parameters based on whether or not locations are in a common area. The target table T and the source table S2 in FIG. 8 are the same as the target table T and the source table S2 in FIG. 5.

In the case of the SameCityMap function shown in FIG. 2, the same area map generator 44 generates a parameter associating each record in the target table T with each record in the source table S2 in which the location indicated by the value of the first geographic attribute and the location indicated by the value of the second geographic attribute are within the same area.

In the example shown in FIG. 8, the attribute in the "target_location" column of the target table T is the first geographical attribute, and the attribute in the "Pickup_location" column of the source table S2 is the second geographical attribute. These two columns are associated. The columns to be associated in the first table and the second table may be established in advance or specified by the attribute specifying unit 33 described later.

As a result, parameter P13 shown in FIG. 8 is generated. The map data M13 shown in FIG. 8 is the result of associating each record in the target table T with each record in the source table S2 having geographic attributes determined to be in the same area. Note that the map data M13 shown in FIG. 8 provisionally associates geographic points within a distance of 1 km as being located in the same municipality.

The inclusion map generator 42 generates a map parameter when a similarity function for associating a first table with a second table based on the inclusion relationship is received. In the example shown in FIG. 2, this corresponds to the InclusionMap function being set in the config file.

The inclusion map generator 42 generates a map parameter for combining records contained in the first table with records contained in the second table when a location indicated by the value of a first geographic attribute is present in the area indicated by the value of the second geographic attribute.

Figure 9:
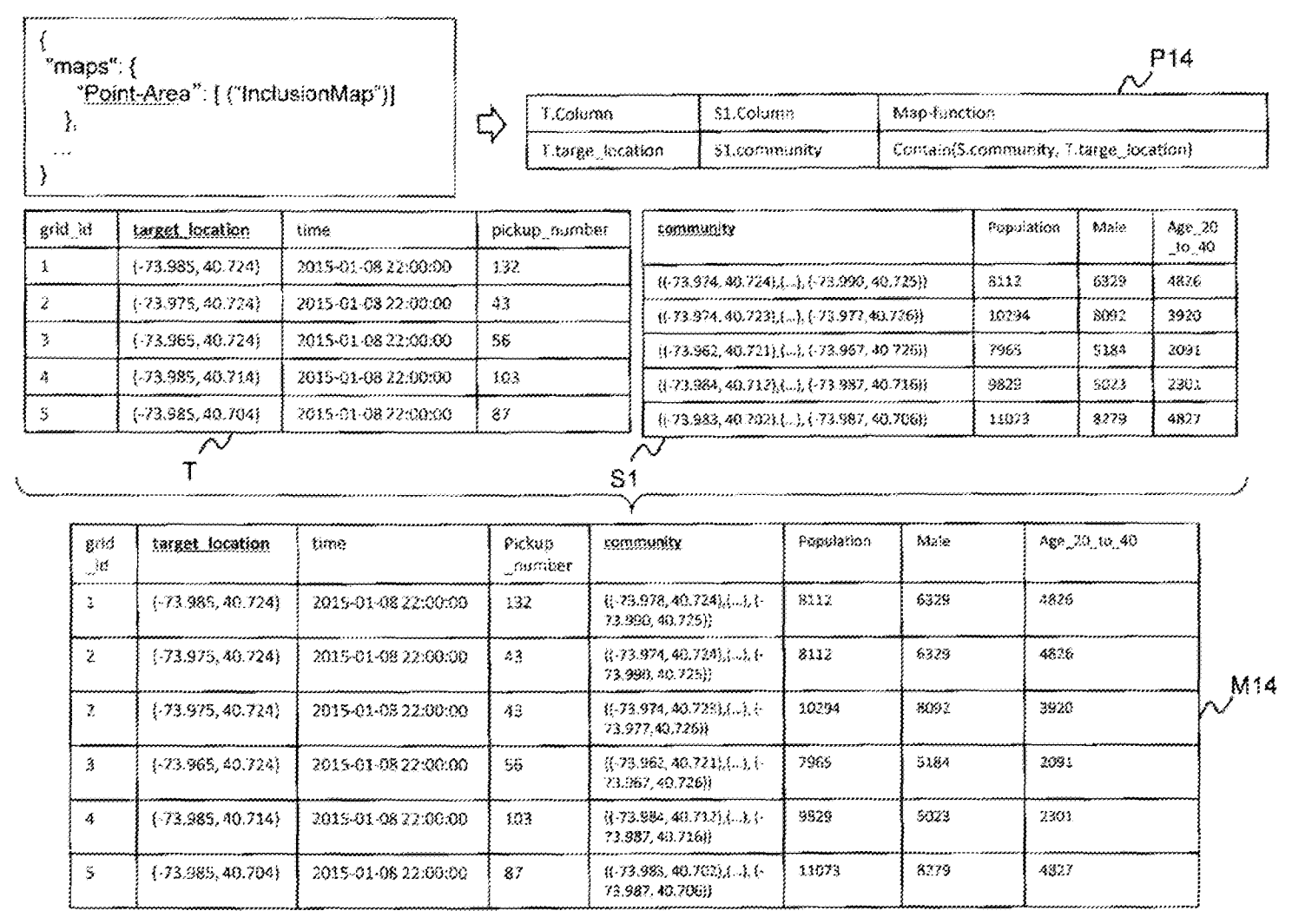

FIG. 9 is a diagram used to explain an example of processing performed to generate map parameters based on an inclusion relationship. The target table T in FIG. 9 is the same as the target table T in FIG. 5. The source table S1 in FIG. 9 is used to associate and record the overall population, the number of males, and the number of people age 20 to 40 in each area.

In the case of the InclusionMap function shown in FIG. 2, the inclusion map generator 42 generates a parameter associating each record in the target table T with each record in the source table S1 in which a location indicated by the value of the first geographic attribute is within the area indicated by the value of the second geographic attribute.

In the example shown in FIG. 9, the attribute in the "target_location" column of the target table T is the first geographical attribute, and the attribute in the "community" column of the source table S1 is the second geographical attribute. These two columns are associated. The columns to be associated in the first table and the second table may be established in advance or specified by the attribute specifying unit 33 described later.

As a result, parameter P14 shown in FIG. 9 is generated. The map data M14 in FIG. 9 shows the results of associating each record in the target table with the records in the source table S1 that are in the same area.

The overlap map generator 43 generates a map parameter when a similarity function for associating a first table and a second table based on overlapping areas is received. In the example shown in FIG. 2, this corresponds to the IntersectMap function being set in the config file.

The overlap map generator 43 generates a map parameter for combining records contained in the first table with records contained in the second table when an area indicated by the value of a first geographic attribute overlaps with an area indicated by the value of the second geographic attribute.

The time difference map generator 31 generates a map parameter when a similarity function and condition (such as a similarity threshold value) for associating a first table and a second table based on a time difference is received. In the example shown in FIG. 2, this corresponds to the TimeDiffMap function being set in the config file.

The time difference map generator 31 generates a combination condition for combining a record in a first table with a record in a second table so that the relationship between the value of a first temporal attribute and the value of a second temporal attribute satisfy a degree of temporal relationship. In the present embodiment, the time difference map generator 31 generates a parameter for combining a record in a first table with a record in a second table when the difference between the value of a first temporal attribute and the value of a second temporal attribute is at or below a threshold value.

FIG. 10 is a diagram used to explain an example of processing performed to generate map parameters based on time differences. The target table T and source table S2 in FIG. 10 is the same as the target table T and source table S2 in FIG. 5.

In the case of the TimeDiffMap function shown in FIG. 2, the time difference map generator 31 generates a parameter for associating each record in target table T with records in source table S2 in which the difference between the value of a first temporal attribute and the value of a second temporal attribute is at or below 30 minutes. The time difference map generator 31 generates a parameter for associating each record in target table T with records in source table S2 in which the difference between the value of a first temporal attribute and the value of a second temporal attribute is at or below 60 minutes.

In the example shown in FIG. 10, the attribute in the "time" column of the target table T is the first geographical attribute, and the attribute in the "pickup_time" column of the source table S2 is the second geographical attribute. These two columns are associated. The columns to be associated in the first table and the second table may be established in advance or specified by the attribute specifying unit 33 described later.

As a result, parameter P15 shown in FIG. 10 is generated. The map data M15 in FIG. 10 shows the results of associating each record in the target table T with the records in the source table S2 with a time difference at or below 30 minutes.

The exact map generator 32 generates a map parameter when a similarity function for associating a first table with a second table has been received. In the present embodiment, a parameter is generated for associating records in the target table with records in a source table based on the value of an attribute that is neither a geographic attribute nor a temporal attribute.

In the example shown in FIG. 2, this corresponds to the ExactMap function being set in the config file. The exact map generator 32 generates a map parameter for combining a record in the first table with a record in the second table when the value of the first geographic attribute and the value of the second geographic attribute match.

FIG. 11 is a diagram used to explain an example of processing performed to generate map parameters based on text similarities. The target table T in FIG. 11 is a table including data indicating the number of passengers at a given location (pickup_number). The source table S in FIG. 11 is a table for recording the average receipt in each area.

In the case of the textSimMap function described above, the exact map generator 32 generates a parameter for associating each record in the target table T with records in the source table S when the degree of similarity between the value of the first character string attribute and the value of the second character string attribute is 0.8 or more. The exact map generator 32 generates a parameter for associating each record in the target table T with records in the source table S when the degree of similarity between the value of the first character string attribute and the value of the second character string attribute is 0.9 or more or 1.0 or more.

In the example shown in FIG. 11, an "address" string in target table T is recorded as the first string attribute and an "address" string in the source table S is recorded as the second string attribute. Therefore, these two strings are associated. As a result, the parameter P16 shown in FIG. 11 is generated.

The map data M in FIG. 11 shows the results of associating each record in the target table T with records in the source table S having a degree of similarity of 0.8 or more. In one example, only one record from the source table is associated with the first record in the target table.

FIG. 12 is a diagram used to explain an example of processing performed to generate map parameters based on structural similarities. The target table T in FIG. 12 includes data indicating the number of times a web page identified by a certain URL has been accessed (access_number). The source table S in FIG. 12 records the number of times the web page identified by the URL was accessed in the previous month (access_number).

In the case of the pathDisMap function described above, the exact map generator 32 generates a parameter for associating each record in the target table T with records in the source table S when the distance between the value of the first structural attribute and the value of the second structural attribute is 1 or less. The exact map generator 32 generates a parameter for associating each record in the target table T with records in the source table S when the distance between the value of the first structural attribute and the value of the second structural attribute is 2 or less or 3 or less.

In the example shown in FIG. 12, a "URL" string in target table T is recorded as the first string attribute and a "URL" string in the source table S is recorded as the second string attribute. Therefore, these two strings are associated. As a result, the parameter P17 shown in FIG. 12 is generated.

The map data M in FIG. 12 shows the results of associating each record in the target table T with records in the source table S having a degree of similarity of 1 or less. In one example, only one record from the source table is associated with the first record in the target table.

The attribute specifying unit 33 specifies attributes with a shared perspective in the first table and the second table. Specifically, the attribute specifying unit 33 specifies the attribute of data indicated by each string in the first table and the attribute of data indicated by each string in the second table as the same attribute. For example, in the case of the geographic data type, the attribute specifying unit 33 specifies first geographic attributes having the same data type as the first geographic data type in the first table and second geographic attributes having the same data type as the second geographic data type in the second table. In this way, strings having a geographic data type can be specified in each table. The attribute specifying unit 33 may specify the attribute of strings in the first table and the second table from string attribute information inputted to the input unit 10.

The map parameter generator 30 (more specifically, each generator in the map parameter generator 30) may store in the storage unit 80 parameters including the degree of geographic (or temporal) relationship between strings in the first table including a first geographic (or temporal) attribute whose geographic (or temporal) relationship is to be determined and strings in the second table including a second geographic (or temporal) attributes. For example, the map parameter generator 30 may store in the storage unit 80 parameter P11 in FIG. 5 or parameter P15 in FIG. 10.

FIG. 13 is a diagram used to explain an example of generated map parameters. As in the examples described above, the input unit 10 receives target table T, source table S1 and source table S2 shown in FIG. 13, and portion C1 of the config file shown in FIG. 2. In this example, map parameter P16 is generated based on the KNearestMap function using the attribute in the "target_location" string in target table T as the first geographic attribute, the attribute in the "community" string in source table S1 as the second geographic attribute. The map parameter generator 30 (more specifically, each generator in the map parameter generator 30) generates the thirteen map parameters P11-16 shown in FIG. 13 from this information.

The filter parameter generator 50 includes exact filter generator 51. The exact filter generator 51 generates a filter parameter in which a column in the second table is associated with an extraction condition applied to the column.

Any method can be used to generate the filter parameter. The exact filter generator 51 may generate a filter parameter based, for example, on the information defined in portion C2 of the config file shown in FIG. 2. Extraction conditions may be stored beforehand in the storage unit 80 and the exact filter generator 51 may retrieve an extraction condition to generate a filter parameter.

The exact filter generator 51 may also combine multiple extraction conditions to generate an extraction condition. Any number of extraction conditions may be combined. The input unit 10 may, for example, receive the maximum number for such combinations. For example, as shown in FIG. 2, a parameter indicating the maximum number of combinations ("max_combination_filter_length") may be set in the C4 portion of the config file.

The reduction parameter generator 60 (more specifically, each generator in the reduction parameter generator 60) generates a parameter indicating the method used to reduce the data in each row of the second table. The reduction parameter generator 60 includes a geo-reduce generator 70 and a numerical reduce generator 61.

The geo-reduce generator 70 (more specifically, each generator in the geo-reduce generator 70) generates a reduction parameter indicating the method used to reduce data in each row using values in a column including geographic attributes in the second table. Specifically, the geo-reduce generator 70 calculates the statistical value of the geographic attribute based on the indicated reduction method.

Any method may be indicated as the reduction method. The input unit 10 may receive the indicated reduction method. Specifically, the reduction method may be defined based on geographic attribute analysis data type as indicated in portion C3 of the config file in FIG. 2 and the reduction parameter may be generated based on the defined reduction method. The content is described below in detail.

The "Point" line in portion C3 defines the reduction method when the second geographic attribute (more specifically, the geographic data type) is expressed by a point (Point).

("sum," "distance") defines a reduction method in which the total distance based on a first geographic attribute value and a second geographic attribute value among records in the second table associated with records in the first table is calculated as a statistical value.

("avg," "distance") defines a reduction method in which the average distance based on a first geographic attribute value and a second geographic attribute value among records in the second table associated with records in the first table is calculated as a statistical value.

("count") defines a reduction method in which the number of records in the second table associated with each record in the first table (that is, target variables) is calculated as a statistical value.

The "Area" line in portion C3 defines the reduction method when the second geographic attribute (more specifically, the geographic data type) is expressed by an area (Area).

("sum," "areaSize") defines a reduction method in which the total size of the area in the second geographic attribute value among records in the second table associated with records in the first table is calculated as a statistical value.

("avg," "areaSize") defines a reduction method in which the average size of the area in the second geographic attribute value among records in the second table associated with records in the first table is calculated as a statistical value.

("count") defines a reduction method in which the number of records in the second table associated with each record in the first table (that is, target variables) is calculated as a statistical value.

The geo-reduce generator 70 has a point reduce generator 71 and an area reduce generator 72.

The point reduce generator 71 generates a reduction parameter for calculating the distance based on the value of the first geographic attribute and the value of the second geographic attribute as a statistical value. Here, the records in the second table to be processed are each associated with a record in the first table. In the case of geographic attributes, as mentioned above, records are associated with each other that satisfy a certain condition such as the value of the first geographic attribute and the value of the second geographic attribute matching or falling within a certain range. When the value of the first geographic attribute and the value of the second geographic attribute satisfy a predetermined condition, the point reduce generator 71 generates a reduction parameter for calculating the distance as a statistical value based on the value of the first geographic attribute and the value of the second geographic attribute satisfying the condition. The calculated statistical value is used as a feature.

When at least one of ("sum," "distance"), ("avg," "distance") and ("count") in FIG. 2 has been set in the config file, the point reduce generator 71 generates a reduction parameter for calculating the statistical value of the distance.

Figure 14:
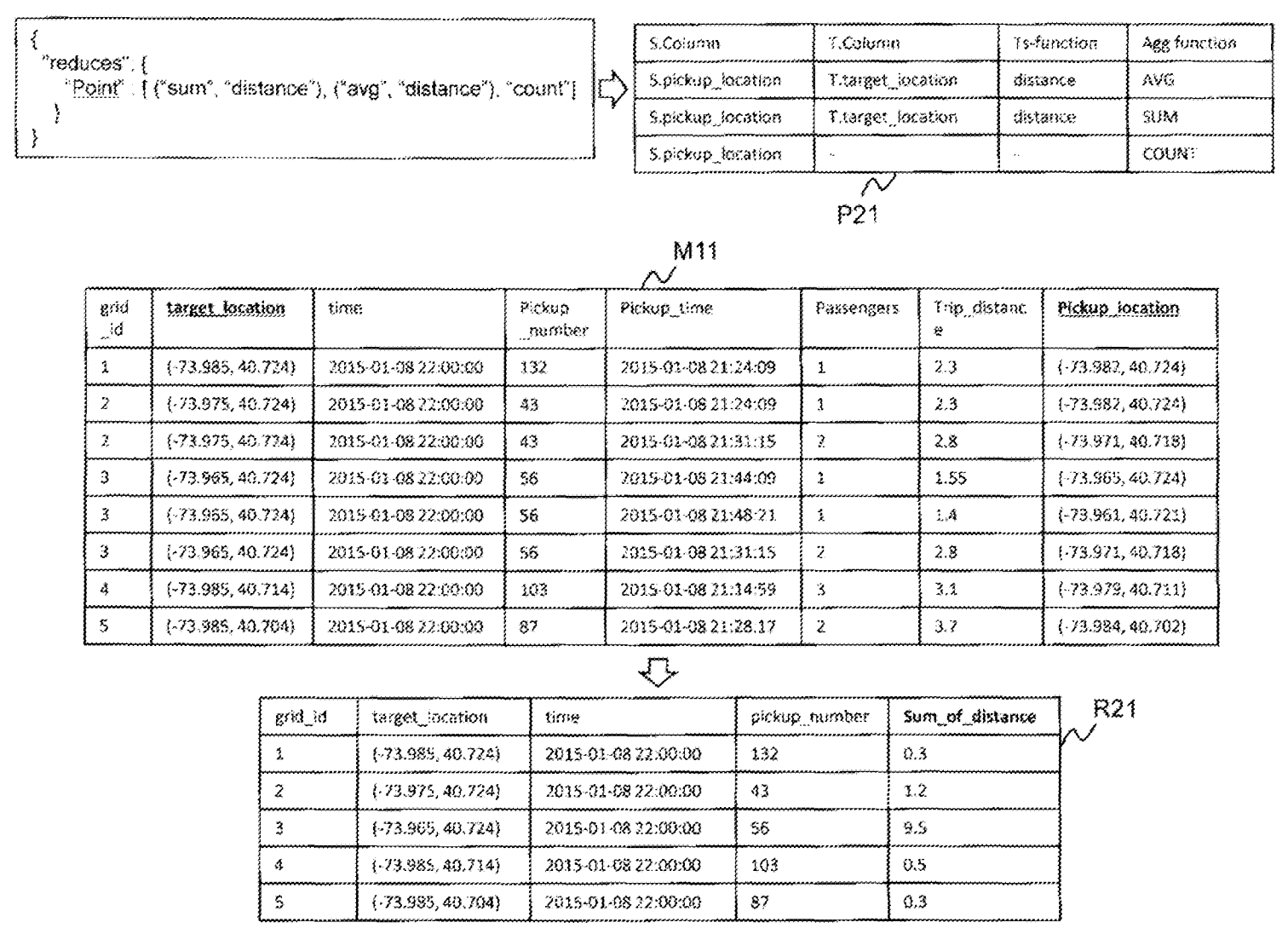

FIG. 14 is a diagram used to explain an example of processing performed to generate reduction parameters for calculating distance statistics. In the example shown in FIG. 14, three types of reduction method are set in the config file. Therefore, the point reduce generator 71 calculates a reduction parameter for calculating the total and average distance between a record in the source table and a record in the target table and a reduction parameter for calculating the number of records in the associated source table. As in the reduce list P21 shown in FIG. 14, the point reduce generator 71 may generate a reduction parameter in which the column name in the source table to be reduced, the column name in the target table to be associated, the reduction content (distance), and the reduce function are associated.

The reduce list R21 shown in FIG. 14 shows the result of reducing map data M11 based on the reduction parameter used to calculate the distance totals.

The area reduce generator 72 generates a reduction parameter for calculating the statistical value of an area based on the value of the second geographic attribute. As in the case of the point reduce generator 71, the records in the second table to be processed are each associated with a record in the first table.

When at least one of ("sum," "areaSize"), ("avg," "areaSize") and ("count") in FIG. 2 has been set in the config file, the area reduce generator 72 generates a reduction parameter for calculating the statistical value of the area.

FIG. 15 is a diagram used to explain an example of processing performed to generate reduction parameters for calculating area statistics. In the example shown in FIG. 15, three types of reduction method are set in the config file. Therefore, the area reduce generator 72 calculates a reduction parameter for calculating the total and average area of the records in the source table associated with each of the records in the target table, and a reduction parameter for calculating the number of records in the associated source table. As in the reduce list P22 shown in FIG. 15, the area reduce generator 72 may generate a reduction parameter in which the column name in the source table to be reduced, the reduction content (area), and the reduce function are associated.

The reduce list R22 shown in FIG. 15 shows the result of reducing map data M14 based on the reduction parameter used to calculate the area totals.

The numerical reduce generator 61 generates a reduction parameter indicating the method used to reduce the data in each line using a value including attributes with a numerical value (numerical attribute below) in the second table. Specifically, the numerical reduce generator 61 calculates numerical statistics based on the indicated reduction method.

Any reduction method can be indicated. As in the case of the geo-reduce generator 70, the input unit 10 may receive the indicated reduction method. Specifically, the reduction method for the numerical attributes may be defined as indicated in portion C3 of the config file in FIG. 2, and a reduction parameter generated based on the defined reduction method. In the example shown in FIG. 2, a reduction parameter for calculating the total and average for the columns with numerical attributes has been indicated.

The reduction parameter generator 60 (more specifically, the generators in the reduction parameter generator 60) may store the generated reduction parameter in the storage unit 80. FIG. 16 is a diagram used to explain an example of generated reduction parameters.

As in the example described above, the input unit 10 receives target table T, source table S1 and source table S2 in FIG. 16 and portion C3 in the config file shown in FIG. 2.

Reduction parameter P23 is a reduction parameter for numerical attribute columns in source table S2. Reduction parameter P24 is a reduction parameter for numerical attribute columns in source table S1. The reduction parameter generator 60 (more specifically, the generators in the reduction parameter generator 60) generates the sixteen map parameters P21-24 in FIG. 16 from this information.

The feature descriptor generator 81 generates a feature descriptor generator for generating the features described above from the first table and the second table. Specifically, the feature descriptor generator 81 generates a feature descriptor using (combining) the combination condition (map parameter) and reduction condition (reduction parameter) described above. The feature descriptor generator 81 may generate a feature descriptor using (combining) an extraction condition (filter parameter) in addition to the combination condition and reduction condition.

In the present embodiment, the feature descriptor generator 81 may generate a map parameter previously combining a map parameter for geographic attributes and a map parameter for temporal attributes among the combination conditions (map parameters). For example, when "True" has been set in the parameter "time_spatial_map_combination" as in portion C4 of the config file shown in FIG. 2, the feature descriptor generator 81 may determine that a map parameter for geographic attributes is to be combined with a map parameter for temporal attributes.

FIG. 17 is a diagram used to explain an example of combined map parameters. For example, there may be six map parameters P11, P12 for geographic attributes and two map parameters P15 for temporal attributes. At this time, the feature descriptor generator 81 may combine one map parameter for geographic attributes with one map parameter for temporal attributes to generate a new map parameter P31. In the example shown in FIG. 17, 6×2=12 new map parameters are generated.

The following is a detailed explanation of the process performed by the feature descriptor generator 81 to generate feature descriptors. Here, target table T and source tables S1 and S2 in FIG. 13 are inputted. The variable (target variable) for the prediction target is a variable indicating the number of passengers picked up in target table T (pickup_number).

FIG. 18 is a diagram used to explain an example of a method used to combine parameters and generate a feature descriptor. FIG. 18 (a) shows a combination example used to generate a feature descriptor for generating a feature from target table T and source table S1. FIG. 18 (b) shows a combination example used to generate a feature descriptor for generating a feature from target table T and source table S2. In the example shown in FIG. 18 (b), a map parameter is used that combines a map parameter for a geographic attribute and a map parameter for a temporal attribute.

In the example shown in FIG. 18 (a), four map parameters and nine reduction parameters are generated. The feature descriptor generator 81 selects one parameter each from the map parameters and the reduction parameters and generates a combination of the parameters. In this example, 4×9=36 combinations can be generated based on these parameters. When a filter parameter is generated, the feature descriptor generator 81 selects one each from the map parameters, filter parameters, and reduction parameters to generate a combination of the parameters.

In the example shown in FIG. 18 (b), fourteen map parameters and seven reduction parameters are generated. The feature descriptor generator 81 selects one parameter each from the map parameters and the reduction parameters and generates a combination of the parameters. In this example, 14×7=94 combinations can be generated based on these parameters. In all, 36+94=130 parameter combinations can be generated.

Next, the feature descriptor generator 81 generates a feature descriptor based on the generated combination. More specifically, the feature descriptor generator 81 converts the parameters in the generated combination into the format of the query language for operating and defining table data. For example, the feature descriptor generator 81 may use SQL as the query language.

At this time, the feature descriptor generator 81 may apply the parameters to a template for producing an SQL statement to generate a feature descriptor. The template for generating an SQL statement may be prepared for each parameter in advance, and the feature descriptor generator 81 may apply each parameter in the generated combination to the template in successive order to generate an SQL statement. Here, the feature descriptor is defined as an SQL statement and each of the selected parameters corresponds to a parameter for generating an SQL statement.

When a feature is defined by combining parameters, various feature descriptors can be expressed as combinations of simple elements. Therefore, various feature candidates can be efficiently generated using table data. For example, in the example described above, 130 different features can be easily generated by generating four map parameters and nine reduction parameters and by generating 14 map parameters and seven reduction parameters. Because the definitions of each parameter generated can be reused, the labor required to generate feature descriptors can be reduced.

The feature generator 82 generates features using feature descriptors. For example, feature descriptors may include parameters for calculating distances as statistical values as described above. In this case, the feature generator 82 may calculate distances as statistical values by reducing the records in the second table meeting a predetermined condition by each record with a first geographic attribute based on a feature descriptor.

Specifically, the feature generator 82 may calculate the total or average for the distance in second table geographic attributes satisfying a predetermined condition with each record having a first table geographic attribute to reduce the records in the second table. The feature generator 82 may then add the calculated total or average for the distance as a feature to an attribute in the first table.

Alternatively, the feature generator 82 may calculate the number of records with geographic attributes satisfying a predetermined condition in the second table with each record having a geographic attribute in the first table to reduce the records in the second table. The feature generator 82 may then add the calculated number of records as a feature to an attribute in the first table.

Because the feature generator 82 can add generated features to attributes in the first table, the feature generator 82 can be said to be an attribute adding means. Because features generated by the feature generator 82 are candidates for the feature selector 83 to select as described later, the features can also be referred to as feature candidates.

In the present embodiment, the feature generator 82 generates feature candidates using feature descriptors. However, feature candidates may also be generated directly by the feature generator 82 from the first table and the second table using a similarity function, a combination condition, and a reduction condition. As described above, the degree of similarity calculated from the value of a first attribute and the value of a second attribute is a combination condition used to combine records in the first table including values for first attributes and records in the second table including values for second attributes that satisfy the condition. A reduction condition is expressed as a reduction method for records in the second table and columns to be reduced.

When there are multiple combination conditions and reduction conditions, the feature generator 82 may generate features by combining combination conditions with reduction conditions. By combining combination conditions and reduction conditions, the same effect can be achieved as the feature descriptor generator 81 generating feature descriptors.

The feature selector 83 selects the optimum feature for a prediction from among the generated features. Any feature selecting method may be used. The feature selector 83 may select a feature using, for example, L1 regularization. However, the algorithm used to select a feature is not limited to L1 regularization. The feature selector 83 may select the optimum feature for a prediction based on the algorithm used to select the feature.

The output unit 90 outputs the generated feature. The output unit 90 may output only the feature selected by the feature selector 83 or may output all of the features generated by the feature generator 82.

The learning unit 91 learns a prediction model using the generated feature. The learning unit 91 learns prediction models using added attributes as features. Specifically, the learning unit 91 applies data from the first table and the second table to the generated feature to produce training data. The learning unit 91 uses generated features as candidates for explanatory variables to learn a model that predicts the values to be predicted. Any model learning method can be used.

The predicting unit 92 makes predictions using the model learned by the learning unit 91. Specifically, the predicting unit 92 applies data from the first table and the second table to a generated feature to generate prediction data. The predicting unit 92 applies the generated prediction data to the learned model and obtains prediction results.

The input unit 10, geo-coder 20, map parameter generator 30, filter parameter generator 50, reduction parameter generator 60, feature descriptor generator 81, feature generator 82, feature selector 83, output unit 90, learning unit 91, and predicting unit 92 are realized by a computer processor that operates according to a program (information processing program) such as a central processing unit (CPU), graphics processing unit (GPU), or field-programmable gate array (FPGA). More specifically, the map parameter generator 30 is realized by the geo-map generator 40 (distance map generator 41, inclusion map generator 42, overlap map generator 43, same area map generator 44), time difference map generator 31, exact map generator 32, and attribute specifying unit 33. The reduction parameter generator 60 is realized by the geo-reduce generator 70 (point reduce generator 71, area reduce generator 72) and the numerical reduce generator 61.

The input unit 10, geo-coder 20, map parameter generator 30, filter parameter generator 50, reduction parameter generator 60, feature descriptor generator 81, feature generator 82, feature selector 83, output unit 90, learning unit 91, and predicting unit 92 may be operated in accordance with a program stored in the storage unit 80 and retrieved by a processor. The functions of the information processing system may be provided in the SaaS (software as a service) format.

The input unit 10, geo-coder 20, map parameter generator 30, filter parameter generator 50, reduction parameter generator 60, feature descriptor generator 81, feature generator 82, feature selector 83, output unit 90, learning unit 91, and predicting unit 92 may also be realized by dedicated hardware. Some or all of the components in these devices may be realized by a combination of general or dedicated circuitry and processors. These may be mounted in a single chip or across multiple chips connected via a bus. Some or all of the components in these devices may be realized by a combination of the circuitry and processors described above.

When some or all of the components in these devices are realized by a plurality of information processing devices and circuits, the plurality of information processing devices and circuits may be arranged centrally or may be distributed. For example, the information processing devices and the circuits may be realized in a form connected via a communication network, such as in a client and server system or in a cloud computing system. The information processing system 100 in the present embodiment may be realized as a single information processing device. Because some or all of the information processing system 100 in the present embodiment is used to generate features, the device including the function of producing a feature can be referred to as the feature generating device.

The following is an explanation of the operations performed by the information processing system 100 in the present embodiment. FIG. 19 is a flowchart showing an example of processing performed to generate combination conditions.

The input unit 10 acquires a first table including a prediction target and first geographic attributes and a second table including second geographic attributes (Step S11). The input unit 10 also receives a geographic relation and the degree of geographic relation (Step S12). The map parameter generator 30 generates a combination condition for combining records in the first table with records in the second table so that the relationship between the value of the first geographic attribute and the value of the second geographic attribute satisfy the degree of geographic relationship (Step S13).

FIG. 20 is a flowchart showing another example of processing performed to generate combination conditions. The input unit 10 acquires a first table including a prediction target and first temporal attributes and a second table including second temporal attributes (Step S21). The input unit 10 also receives a temporal relation and the degree of temporal relation (Step S22). The map parameter generator 30 generates a combination condition for combining records in the first table with records in the second table so that the relationship between the value of the first temporal attribute and the value of the second temporal attribute satisfy the degree of temporal relationship (Step S23).

FIG. 21 is a flowchart showing an example of processing performed to generate features. The input unit 10 acquires a first table including a prediction target and first geographic attributes and a second table including second geographic attributes (Step S31). The feature generator 82 calculates the statistical value of the distance when the value of the second geographic attribute satisfies a predetermined condition relative to the value of the first geographic attribute (Step S32), and the calculated statistical value is added to an attribute of the first table as a feature (Step S33).

FIG. 22 is a flowchart showing another example of processing performed to generate features. The input unit 10 acquires a first table including a prediction target and first attributes and a second table including second attributes (Step S41). The input unit 10 also receives a similarity function used to calculate the degree of similarity between a first attribute and a second attribute and a similarity condition (such as a similarity threshold value) (Step S42). Feature candidates are generated from the first table and the second table using a combination condition and reduction condition in accordance with the similarity function (Step S43). The feature selector 83 then selects the most appropriate feature for a prediction from the feature candidates (Step S44).

In the present embodiment, the input unit 10 acquires a first table including a prediction target and first geographic attributes and a second table including second geographic attributes. The input unit 10 also receives a geographic relation and the degree of geographic relation. The map parameter generator 30 generates a combination condition for combining records in the first table with records in the second table so that the relationship between the value of the first geographic attribute and the value of the second geographic attribute satisfy the degree of geographic relationship. Similarly, in the present embodiment, the input unit 10 acquires a first table including a prediction target and first temporal attributes and a second table including second temporal attributes. The input unit 10 also receives a temporal relation and the degree of temporal relation. The map parameter generator 30 generates a combination condition for combining records in the first table with records in the second table so that the relationship between the value of the first temporal attribute and the value of the second temporal attribute satisfy the degree of temporal relationship. In this way, the amount of labor required to associate information via geographic information or temporal information can be reduced. As a result, the burden on a computer to process information expressed using a variety of expressions can be reduced.

Also, in the present embodiment, the input unit 10 acquires a first table including a prediction target and first geographic attributes and a second table including second geographic attributes. The feature generator 82 calculates the statistical value of the distance when the value of the second geographic attribute satisfies a predetermined condition relative to the value of the first geographic attribute, and the calculated statistical value is added to an attribute of the first table as a feature. In this way, features can be generated efficiently from information sources having geographic information.

Also, in the present embodiment, the input unit 10 acquires a first table including a prediction target and first attributes and a second table including second attributes. The input unit 10 also receives a similarity function used to calculate the degree of similarity between a first attribute and a second attribute and a similarity condition. Feature candidates are generated from the first table and the second table using a combination condition and reduction condition in accordance with the similarity function. The feature selector 83 then selects the most appropriate feature for a prediction from the feature candidates. In this way, the labor required for analysts to generate features can be reduced.

The following is an overview of the present invention. FIG. 23 is a block diagram showing an overview of a feature generating device of the present invention. A feature generating device 380 in the present invention comprises: a table acquiring means 381 (input unit 10) for acquiring a first table (target table) including a prediction target and a first attribute, and a second table (source table) including a second attribute; a receiving means 382 (input unit 10) for receiving a similarity function and a similarity condition used to calculate the degree of similarity between the first attribute and the second attribute; a feature generating means 383 (feature generator 82) for generating feature candidates from the first table and the second table able to affect the prediction target using a combination condition (map parameter) for combining a record in the first table including a value for the first attribute and a record in the second table including a value for the second attribute whose degree of similarity calculated from the value of the first attribute and the value of the second attribute using the similarity function satisfies the condition (similarity condition), a reduction method for the plurality of records in the second table, and a reduction condition (reduction parameter) represented by a column to be reduced; and a feature selecting means 384 (feature selector 83) for selecting the optimum feature for prediction from among the feature candidates.

This configuration can reduce the amount of labor performed by an analyst to generate features.

The feature generating means 383 may generate a number of features combining a combination condition and a reduction condition using a plurality of combination conditions and a plurality of reduction conditions.

The first attribute and the second attribute may be geographic attributes, and the similarity function may be defined as a function calculating a higher degree of similarity for closer distances.

Also, the first attribute and the second attribute may be temporal attributes, and the similarity function may be defined as a function calculating a higher degree of similarity for smaller time differences.

Also, the first attribute and the second attribute may be string attributes, and the similarity function may be defined as a function calculating a higher degree of similarity for a higher match between text in the strings.

Also, the first attribute and the second attribute may be structural attributes, and the similarity function may be defined as a function calculating a higher degree of similarity for closer distances to a shared node.

The feature generating device 380 may further comprise a function generating means (feature descriptor generator 81) for generating a feature descriptor using a combination condition, a reduction condition, and an extraction condition (filter parameter, etc.) for extracting a record satisfying the condition from the second table.

FIG. 24 is a schematic block diagram showing the configuration of a computer related to at least one embodiment. The computer 1000 includes a processor 1001, a main storage device 1002, an auxiliary storage device 1003, and an interface 1004.

This information processing system may be installed in a computer 1000. The operations performed by each processing unit may be stored in an auxiliary storage device 1003 in the format of a program (combination condition generating program). The processor 1001 may retrieve the program from the auxiliary storage device 1003 and load the program in the main storage device 1002 to execute processing in accordance with the program.

The auxiliary storage device 1003 in at least one embodiment is a non-temporary physical medium. An example of a non-temporary physical medium is a magnetic disk, a magneto-optical disk, a CD-ROM, a DVD-ROM, or a semiconductor memory connected via the interface 1004. When the program is distributed to the computer 1000 via a communication line, the computer 1000 receiving the program may load the program in the main storage device 1002 and execute the processing described above.

The program may realize some of the functions described above. The program may also combine these functions with those of another program already stored in the auxiliary storage device in the form of a so-called difference file (difference program).

Some or all of these embodiments are described in the addenda listed below. Note, however, that the present invention is not limited to the following.

(Addendum 1)

A feature generating device comprising: a table acquiring means for acquiring a first table including a prediction target and a first attribute, and a second table including a second attribute; a receiving means for receiving a similarity function and a similarity condition used to calculate the degree of similarity between the first attribute and the second attribute; a feature generating means for generating feature candidates from the first table and the second table able to affect the prediction target using a combination condition for combining a record in the first table including a value for the first attribute and a record in the second table including a value for the second attribute whose degree of similarity calculated from the value of the first attribute and the value of the second attribute using the similarity function satisfies the condition, a reduction method for the plurality of records in the second table, and a reduction condition represented by a column to be reduced; and a feature selecting means for selecting the optimum feature for prediction from among the feature candidates.

(Addendum 2)

A feature generating device according to addendum 1, wherein the feature generating means generates a number of features combining a combination condition and a reduction condition using a plurality of combination conditions and a plurality of reduction conditions.

(Addendum 3)

A feature generating device according to addendum 1 or addendum 2, wherein the first attribute and the second attribute are geographic attributes, and the similarity function is defined as a function calculating a higher degree of similarity for closer distances.

(Addendum 4)

A feature generating device according to addendum 1 or addendum 2, wherein the first attribute and the second attribute are temporal attributes, and the similarity function is defined as a function calculating a higher degree of similarity for smaller time differences.

(Addendum 5)

A feature generating device according to addendum 1 or addendum 2, wherein the first attribute and the second attribute are string attributes, and the similarity function is defined as a function calculating a higher degree of similarity for a higher match between text in the strings.

(Addendum 6)

A feature generating device according to addendum 1 or addendum 2, wherein the first attribute and the second attribute are structural attributes, and the similarity function is defined as a function calculating a higher degree of similarity for closer distances to a shared node.

(Addendum 7)

A feature generating device according to any one of addendum 1 to addendum 6, further comprising a function generating means for generating a feature descriptor using a combination condition, a reduction condition, and an extraction condition for extracting a record satisfying the condition from the second table.

(Addendum 8)

A feature generating method comprising: acquiring a first table including a prediction target and a first attribute, and a second table including a second attribute; receiving a similarity function and a similarity condition used to calculate the degree of similarity between the first attribute and the second attribute; generating feature candidates from the first table and the second table able to affect the prediction target using a combination condition for combining a record in the first table including a value for the first attribute and a record in the second table including a value for the second attribute whose degree of similarity calculated from the value of the first attribute and the value of the second attribute using the similarity function satisfies the condition, a reduction method for the plurality of records in the second table, and a reduction condition represented by a column to be reduced; and selecting the optimum feature for prediction from among the feature candidates.

(Addendum 9)

A feature generating method according to addendum 8, wherein a number of features combining a combination condition and a reduction condition are generated using a plurality of combination conditions and a plurality of reduction conditions.

(Addendum 10)

A feature generating program causing a computer to execute: a table acquiring process for acquiring a first table including a prediction target and a first attribute, and a second table including a second attribute; a receiving process for receiving a similarity function and a similarity condition used to calculate the degree of similarity between the first attribute and the second attribute; a feature generating process for generating feature candidates from the first table and the second table able to affect the prediction target using a combination condition for combining a record in the first table including a value for the first attribute and a record in the second table including a value for the second attribute whose degree of similarity calculated from the value of the first attribute and the value of the second attribute using the similarity function satisfies the condition, a reduction method for the plurality of records in the second table, and a reduction condition represented by a column to be reduced; and a feature selecting process for selecting the optimum feature for prediction from among the feature candidates.

(Addendum 11)

A feature generating program according to addendum 10, wherein the computer is caused in the feature generating process to generate a number of features combining a combination condition and a reduction condition using a plurality of combination conditions and a plurality of reduction conditions.

The present invention was explained above with reference to embodiments and examples. However, it should be noted that the present invention is not limited to these embodiments and examples. For example, it should be clear to those skilled in the art that various modifications can be made to the configuration and details of the present invention without departing from the spirit and scope of the present invention.

The present application claims priority based on U.S. Provisional Patent Application No. 62/568,397 filed on Oct. 5, 2017, which is incorporated herein by reference in its entirety.

KEY TO THE DRAWINGS

10: Input unit
20: Geo-coder
30: Map parameter generator
31: Time diff map generator
32: Exact map generator
33: Attribute identifying unit
40: Geo-map generator
41: Distance map generator
42: Inclusion map generator
43: Overlap map generator
44: Same area map generator
50: Filter parameter generator
51: Filter generator
60: Reduction parameter generator
61: Numerical reduction generator
70: Geo-reduction generator
71: Point reduction generator
72: Area reduction generator
80: Storage unit
81: Feature descriptor generator
82: Feature generator
83: Feature selector
90: Output unit
91: Learning unit
92: Prediction unit

The invention claimed is:

1. A feature creation system that facilitates data mining operations used to produce training data sets to improve accuracy of machine learning models, the system comprising:
   a computer with a processor and a memory, the computer configured to receive a first table and a second table, the first table including multiple rows and including a prediction object and a value for a first attribute, and the second table including multiple rows and a value for a second attribute,
   the first and second attributes used as features for training a machine learning model to generate prediction results for the prediction object;
   the computer further configured to determine a similarity between one or more of the values of the first and second attributes based on a similarity function used to calculate a degree of similarity between the first attribute and the second attribute based on a threshold value for the degree of similarity;
   the computer further configured to generate from the first table and the second table, feature candidates that influence the prediction object based on a joining condition that includes the degree of similarity between the one or more values of the first and second attributes, and a reduction condition, the joining condition used to join one or more records included in the first table and one or more records included in the second table, the reduction condition used to determine a reduction method for reducing a plurality of records and columns in the second table, the feature candidates including values for the first and second attributes that satisfy the similarity condition; and
   the computer further configured to selects a feature for prediction from the feature candidates; and
   the computer further configured to train a prediction model using the selected feature.

2. The feature creation system of claim 1, wherein the joining condition is selected from a plurality of joining conditions and the reduction condition is selected from a plurality of reduction conditions.

3. The feature creation system of claim 2, wherein the computer is further configured to generate the feature candidates using the plurality of the joining conditions and the plurality of the reduction conditions, and the number of the feature candidates is equivalent to a number of combinations consisting of at least one joining condition selected from the plurality of joining conditions and at least one reduction condition selected from the plurality of reduction conditions.

4. The feature creation system of claim 1, wherein the first attribute and the second attribute are geographical attributes, and the similarity descriptor calculates function provides a high value for the similarity based on a near distance between the geographical attributes.

5. The feature creation system of claim 1, wherein the first attribute and the second attribute are temporal attributes, and the similarity function calculates a high value for the similarity based on a small time difference between the temporal attributes.

6. The feature creation system of claim 1, wherein the first attribute and the second attribute are character string attributes, and the similarity function calculates a high value for the similarity based on a high degree of matching of texts represented by the character string attributes.

7. The feature creation system of claim 1, wherein the first attribute and the second attribute are structural attributes, and the similarity function calculates a high value for the similarity based on a near distance between the structural attributes and a common node.

8. The feature creation system of claim 1, wherein the computer is further configured to generate
   a feature descriptor using the joining condition, the reduction condition and a filtering condition.

9. The feature creation system of claim 8, wherein the filtering condition is used to filter records using a condition from the second table.

10. A method that facilitates data mining operations used to produce training data that can be used to improve the accuracy of machine learning models, the method comprising:
    storing in a storage unit a first table and a second table, the first table including multiple rows, having a value for a prediction object and a value for a first attribute, and the second table including multiple rows having a value for a second attribute, the first and second attributes used as features for training a machine learning model to generate prediction results for the prediction object;
    determining a similarity between one or more of the values of the first and second attributes based on a similarity function used to calculate a degree of similarity between the one or more values of the first attribute and the second attribute, and a similarity condition that includes a threshold value for the degree of similarity;
    generating from the first table and the second table, feature candidates that influence the prediction object based on a joining condition that includes the degree of similarity between the one or more values for the first and second attributes and a reduction condition, the joining condition used to join one or more records included in the first table and one or more records included in the second table, the reduction condition used to determine a reduction method for reducing a plurality of records and columns in the second table, the feature candidates including values for the first and second attributes that satisfy the similarity condition;
    selecting an optimum feature for prediction from the feature candidates; and
    training a prediction model using the optimum feature.

11. The method of claim 10, wherein the joining condition is selected from a plurality of joining conditions and the reduction condition is selected from a plurality of reduction conditions.

12. The method of claim 11, wherein the feature candidates are generated using the plurality of the joining conditions and the plurality of the reduction conditions, wherein the number of the feature candidates generated is equivalent to a number of combinations consisting of at least one joining condition selected from the plurality of joining conditions and at least one reduction condition selected from the plurality of reduction conditions.

13. The method of claim 10, wherein the first attribute and the second attribute are geographical attributes, and the similarity function calculates a high value for the similarity based on a near distance between the geographical attributes.

14. The method of claim 10, wherein the first attribute and the second attribute are temporal attributes, and the similarity function calculates a high value for the similarity based on a small time difference between the temporal attributes.

15. The method of claim 10, wherein the first attribute and the second attribute are character string attributes, and the similarity function calculates a high value for the similarity based on a high degree of matching of texts represented by the character string attributes.

16. The method of claim 10, wherein the first attribute and the second attribute are structural attributes, and the similarity function calculates a high value for the similarity based on a near distance between the structural attributes and a common node.

17. The method of claim 10, further comprising:
creating a feature descriptor based on the joining condition, the reduction condition, and a filtering condition.

18. The method of claim 17, wherein the filtering condition filters records using a condition from the second table.

19. A non-transitory computer readable media software instructions that perform a method in a computer with a processor and a memory, the method comprising:
receiving, by the computer, a first table including multiple rows and a second table including multiple rows, the first table including a prediction object and a first attribute, and the second table including a second attribute, the first and second attributes used as features for training a machine learning model to generate prediction results for the prediction object;
determining a similarity between one or more of the values of the first and second attributes based on a similarity function used to calculate a degree of similarity between the one or more values for the first attribute and the second attribute, and a similarity condition that includes a threshold value for the degree of similarity;
generating from the first table and the second table, feature candidates that influence the prediction object based on a joining condition that includes the degree of similarity between the one or more values for the first and second attributes and a reduction condition, the joining condition used to join one or more records included in the first table and one or more records included in the second table, the reduction condition used to determine a reduction method for reducing a plurality of records and columns in the second table, the feature candidates including values for the first and second attributes that satisfy the similarity condition;
selecting a feature for prediction from the feature candidates; and
training a prediction model using the selected feature.

20. The non-transitory computer readable media according to claim 19, wherein the joining condition is selected from a plurality of joining conditions and the reduction condition is selected from a plurality of reduction conditions, wherein the number of the feature candidates generated is equivalent to a number of combinations consisting of at least one joining condition selected from the plurality of joining conditions and at least one reduction condition selected from the plurality of reduction conditions.

* * * * *